(12) United States Patent
Meng et al.

(10) Patent No.: US 10,885,091 B1
(45) Date of Patent: Jan. 5, 2021

(54) SYSTEM AND METHOD FOR CONTENT PLAYBACK

(71) Applicant: Amazon Technologies, Inc., Reno, NV (US)

(72) Inventors: Jane Meng, San Francisco, CA (US); Toby Ray Latin-Stoermer, Seattle, WA (US); Jason Christopher Hall, Seattle, WA (US); Kintan Dilipkumar Brahmbhatt, San Francisco, CA (US); Daniel Paul Ryan, Seattle, WA (US); Benjamin Lee Shepherd, Issaquah, WA (US); Daren Gill, Concord, MA (US); Brandon Scott Durham, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 292 days.

(21) Appl. No.: 15/839,439

(22) Filed: Dec. 12, 2017

(51) Int. Cl.
*G06F 16/432* (2019.01)
*H04L 29/08* (2006.01)
*G06F 21/31* (2013.01)
*G06F 16/9032* (2019.01)
*G06F 16/23* (2019.01)
(Continued)

(52) U.S. Cl.
CPC ............ *G06F 16/433* (2019.01); *G06F 16/23* (2019.01); *G06F 16/24578* (2019.01); *G06F 16/635* (2019.01); *G06F 16/639* (2019.01); *G06F 16/686* (2019.01); *G06F 16/90332* (2019.01); *G06F 21/31* (2013.01); *H04L 67/306* (2013.01)

(58) Field of Classification Search
CPC ............... G06F 16/3344; G06F 16/337; G06F 16/2457; G06F 16/639; G06F 16/433; G06F 16/90332; G06N 3/08
See application file for complete search history.

(56) References Cited

U.S. PATENT DOCUMENTS

| | | | |
|---|---|---|---|
| 6,839,410 B2 * | 1/2005 | Infosino ............ | H04M 3/42229 379/201.02 |
| 8,539,357 B2 * | 9/2013 | Hildreth ............. | G06K 9/00335 715/733 |

(Continued)

OTHER PUBLICATIONS

Taehyun Ha and Sangwon Lee, User Behavior Model Based on Affordances and Emotions: A New Approach for an Optimal Use Method in Product-User Interactions, 2015, International Journal of Human-Computer Interaction, vol. 31, p. 374 (Year: 2015).*

*Primary Examiner* — William Spieler
(74) *Attorney, Agent, or Firm* — Hogan Lovells US LLP

(57) ABSTRACT

Approaches provide for a voice communications device to control, refine, or otherwise manage the playback of media content in response to instructions, such as spoken instructions. For example, the voice communications device receives input data associated with a command, such as a request to begin media playback. Accounts corresponding to users associated with the command are identified and one or more refinements extracted from the input data are used to filter content, such as from respective content catalogs or via trained models associated with the users. Determined content is generated that includes content from each of the content catalogs or trained models associated with the users. Thereafter, the voice communications device can initiate media playback.

19 Claims, 12 Drawing Sheets

(51) Int. Cl.
*G06F 16/635* (2019.01)
*G06F 16/638* (2019.01)
*G06F 16/68* (2019.01)
*G06F 16/2457* (2019.01)

(56) References Cited

U.S. PATENT DOCUMENTS

| | | | | |
|---|---|---|---|---|
| 9,338,493 | B2* | 5/2016 | Van Os | G06F 16/73 |
| 9,363,155 | B1* | 6/2016 | Gravino | G06Q 30/02 |
| 9,390,726 | B1* | 7/2016 | Smus | G10L 21/06 |
| 9,471,203 | B1* | 10/2016 | O'Dell, III | G06F 3/04886 |
| 2003/0125954 | A1* | 7/2003 | Bradley | H04M 3/42042 |
| | | | | 704/270 |
| 2007/0271518 | A1* | 11/2007 | Tischer | H04H 60/31 |
| | | | | 715/744 |
| 2014/0181910 | A1* | 6/2014 | Fingal | H04L 63/105 |
| | | | | 726/4 |
| 2017/0083963 | A1* | 3/2017 | Agarwal | G06F 16/951 |
| 2018/0189400 | A1* | 7/2018 | Gordon | G06F 40/30 |

* cited by examiner

SYSTEM AND METHOD FOR CONTENT PLAYBACK

BACKGROUND

As electronic devices become increasingly sophisticated, people are using such devices in new and interesting ways. Some of these devices have adopted voice control where the device can perform various actions in response to a spoken question or instruction. For example, in response to a question or instruction, these devices can provide information, music, audiobooks, news, weather, traffic, sports, control connected devices, etc. In various situations involving media content, multiple users may have accounts associated with content on the devices. Conventional approaches typically enable a single user to access content, which may be undesirable if the multiple users have dissimilar content interests. This can be frustrating to some users and in instances negatively affect the overall user experience.

BRIEF DESCRIPTION OF THE DRAWINGS

Various embodiments in accordance with the present disclosure will be described with reference to the drawings, in which.

DETAILED DESCRIPTION

Figure 1:
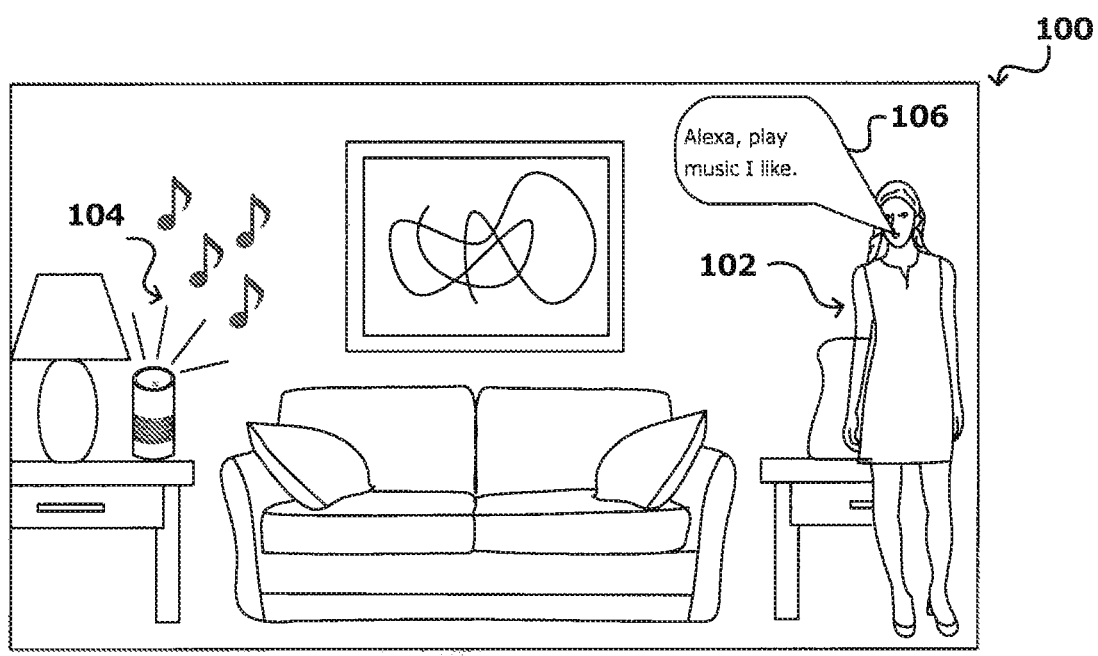
FIG. 1 illustrates an example environment in which aspects of the various embodiments can be utilized.

Systems and methods in accordance with various embodiments of the present disclosure may overcome one or more of the aforementioned and other deficiencies experienced in conventional approaches to controlling playback of media content. In particular, various approaches provide for using a voice communications device to control, refine, or otherwise manage the playback of media content in response to a spoken instruction.

For example, and as described further herein, a voice communications device can perform various actions in response to a spoken question or request. In one such example, the voice communications device can receive a request to initiate or refine playback of media content, such as music, news, audio books, audio broadcasts, and other such content. In this example, input data, which may be audio input data or electronic input data via an application on a user device or a remote, can include the request or command. This input data can be received by the voice communications device and an application executing on the voice communications device or otherwise in communication with the voice communications device can analyze the input data to determine how to carry out the request. The request can be used to, for example, initiate, refine, or otherwise control the playback of media content, where refining the playback of media content can include filtering media content from one or more catalogs of media content, generating a playlist or catalog of media content, and/or adjusting a catalog or playlist by adding, removing, or changing the frequency of playback. In accordance with an embodiment, the application can determine an identity or associated user account associated with the input data. This account may correspond to a library or catalog of media content that the user has permission to access, for example, through an authorized content streaming account or purchase of content. Additionally, in various embodiments, the account may correspond to user preferences or a user history influenced by a training module, such as a trained content model. The application receives the input data, which may be a voice command, and analyzes the input data to correlate the input data with one or more authorized user accounts. Thereafter, the application can analyze the instruction to determine how to proceed. For example, the application may parse the input data, extract one or more words associated with commands, and proceed to initiate actions based on the commands. Furthermore, in embodiments, commands received from the user may be tailored to the user. For example, the user may request "happy" music or "faster" music, or a specific genre or type, such as "smooth 80s jazz" and the system can thereafter provide appropriate content based on the user's profile. The profile may include a history of previously accessed content that is utilized to provide recommendations to the user or refine media playback. Accordingly, the input data may be utilized to control playback of media content.

In certain embodiments, more than one user having an authorized user account may be proximate the voice communications device or an electronic device controlled by the voice communications device. These users may have dissimilar tastes in media content. As a result, when one user requests playback of media content, the other users may not enjoy the media content. This may decrease the user experience and reduce the frequency that certain users interact with the voice communications device. In various embodiments, the voice communications device may determine that more than one user is present. For instance, the voice communications device may receive a voice instruction from two different users, analyze the instructions, and determine that two different users provided the instructions. Additionally, in embodiments, a single user may issue an instruction or command that indicates multiple users are present. For example, the user may use plural pronouns, such as "we", "us", "everyone", "anyone", and the like. Upon receipt of such input data, the voice communications device may request the identity of all users that are present. From there, the device may access media catalogs from each user, apply refinements to each catalog, and generate a new catalog containing media content that both users would find acceptable and predictably enjoy. In various embodiments, the voice communications device may be in communication with a training module, such as a content training module, that records user's content use history and thereafter predicts content that the user may enjoy based on the history. The voice communications device may, rather than accessing and generating new catalogs, apply information from training modules associated with the users to thereby access media content consistent with both of the histories for the users. As a result, multiple users may interact with the voice communications device and receive media content that is enjoyed by all persons within proximity of the voice communications device.

In various embodiments, the system supports multiple profiles individually. That is, multiple user accounts may be associated with the system, which each user having an account being able to modify or refine media content playback. For example, a first user may speak, for example to provide a command. The system may analyze the command to determine both an identity of the speaker and the command. Once the identity is determined, media content that is tailored to the first user's preferences may be refined or started. Additionally, at a different time, a second user may speak, for example to provide a refinement command. Upon receipt of the command, the system may analyze the command to determine both an identity of the second user and the command. Then, media content may be refined based on the second user's preferences. In various embodiments, refinements based on commands from more than one user may be aggregated such that the second command does not provide media content that would not be acceptable or in line with preferences of the first user. For example, if the first user requested playback of "pop music" and the second user refined the playback to be "90s pop music" the system may refine the media content playback to include 90s pop music that both the first user and the second user would predictably enjoy based on previously media content playback histories of both the first and second users.

In certain embodiments, an unrecognized user may request playback of media content. The voice communications device may receive the command, analyze the command to determine an identity of the user, and determine that the user is not associated with an authorized user account. In certain embodiments, authorized users may enable one or more settings that allow unrecognized users to initiate playback and refinement of media content. In this instance, the voice communications device may generate a catalog of media content that is an aggregation of media content from all user accounts associated with the voice communications device. Additionally, in embodiments, the voice communications device may be in communication with a training module that receives requests from unrecognized users. The training module may pool all request from unrecognized users to generate a history or predict content associated with unrecognized users. Moreover, the commands or content related to the unrecognized users may not be utilized with the training modules associated with authorized users. As a result, a variety of media content may be accessible. In certain embodiments, the voice communications device may not track or otherwise record the history of media playback associated with the unrecognized user. As a result, instructions from the unrecognized user will not influence future media playback for the authorized users.

FIG. 1 illustrates an example environment 100 wherein a user 102 is interacting with a voice communications device 104. Although a voice communications device (e.g., Amazon Echo) is shown, it should be understood that various other types of electronic device that are capable of receiving electronic messages can be used in accordance with various embodiments discussed herein. These devices can include, for example, portable computing device, notebook computers, ultrabooks, tablet computers, mobile phones, personal data assistants, video gaming consoles, televisions, set top boxes, smart televisions, portable media players, and wearable computers (e.g., smart watches, smart glasses, bracelets, etc.), display screens, displayless devices, other types of display-based devices, smart furniture, smart household devices, smart vehicles, smart transportation devices, and/or smart accessories, among others. A voice-enable communications device includes, for example, any device having a microphone or other component configured to generate audio data from sound in the frequency range in which humans communicate. As will be described further herein, voice communications devices include devices that utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode). Moreover, the voice communications devices may utilize applications or other electronic devices to activate some functionality. In this example, the user 102 can speak a request within an environment where the voice communications device 104 is located. The request may be any question, inquiry, instruction, phrase, or other set of one or more words/sounds. For example, the user may say, "Alexa, play music I like." In this example, the word "Alexa" has a special connotation, in that it may be referred to as a wakeword, or activation word (the wakeword would be a different word, or a particular phoneme or a particular sound, such as the sound made by clapping or snapping your fingers). In particular, a wakeword may be detected within input data (which may be audio input data) detected by one or more microphones located on the voice communications device. Persons of ordinary skill in the art will recognize, however, that the one or more microphones may alternatively be located on a separate device in communication with the voice communications device. In some embodiments, after the wakeword is detected, the voice communications device may begin interpreting/analyzing audio input data until no more speech is detected. In general, the voice communications device 104 constantly listens for the wakeword and is otherwise inactive. Once the wakeword is recognized, the voice communications device switches from a passive mode to an active mode. It should be noted that the wakeword does not have to be the first word or sound in a given sentence or request. The voice communications device can be configured such that it can record and store a limited amount of audio input data that should, in most instances, is the amount of time needed to speak a sentence or more. Accordingly, even if a wakeword is recognized in the middle or end of a sentence, the voice communications device will have retained the entire sentence which can then be analyzed by backend servers to determine what is being requested.

An application (e.g., a media service) executing on the voice communications device or otherwise in communication with the voice communications device, can analyze the user's speech (also referred to as utterance) that includes audio input data 106 to perform at least one function. The functions can include, for example, answering questions, playing music, reading audiobooks, controlling connected devices via voice commands/instructions, sending an electronic message (e.g., a text message or a voice message) initiating a phone call, among other such functions. In this example, the user 102 is attempting to refine an active play queue (or current set of media content or media content) being played using the voice communications device.

The voice communications device can be associated with a customer account provided by a service provider. The customer account can include one or more profiles, e.g., one or more family member profiles or other profiles, where each profile can be associated with preferences, access rights, and other information, and may share certain account settings as may include payment information (same credit card), address, media content access types, etc. In embodiments, the customer accounts may be established as nodes, having a parent node as the overall or "system level" account with associated user nodes corresponding to the profiles or individual user accounts. In the situation where one of the members desires to play media or refine media that is playing, the member can activate the voice communications device, for example, using a wakeword, announce who they are, and then speak the text message. Announcing who they are can cause the device to load the appropriate member profile and corresponding preferences, access rights, and other such information. In various embodiments, rather than have a member announce who they are, the voice communications device can automatically determine the member speaking using speech analysis software. For example, an application executing on the voice communications device or otherwise in communication with the device can analyze the speaker's voice to determine an identity of the speaker and associated profile. Based on the identity of the speaker, the appropriate member profile and corresponding preferences, access rights, and contracts authority can be used. It should be noted that other approaches can be implemented to login to a particular profile. For example, each profile may be logged into by, for example, saying the wakeword then a special keyword/phrase (e.g., sign in as Jane) and/or by biometrics (i.e., speaker identification based on sound of voice and, if camera is available, facial recognition or, if fingerprint scanner, fingerprint ID), among other such approaches.

In this example, the customer account can be associated with a user profile associated with user 102, where the user has associated at least one media service with their user account. The media service can include an online service that provides access to media content, such as music, e-books, audio broadcasts, etc. In one example, the media service can be associated with an online electronic marketplace that provides media content. Moreover, in some embodiments, the media service can comprise one or more media libraries or databases. The service provider can provide an internet-based voice service as well as other services. The voice service can receive and can analyze audio input data using speech recognition software and/or other audio analysis software to determine an action to perform based on the received audio input data. In this example, the user 102 is attempting to refine the playback of media content. To initiate the refinement process, the user 102 has spoken a request to play happier music.

In response to the user 102 speaking the phrase "Alexa, play music I like," audio input data 106 that includes the phrase is received at the voice communications device 104 and an application executing on the voice communications device or otherwise in communication with the voice communications device can analyze the audio input data 106. For example, the contents of the audio input data can be streamed to a backend server (see FIG. 8 for further explanation) such that at least a portion of the audio input data can be received by the backend server and analysis can begin on that portion and any subsequent portions immediately upon receipt. In particular, the backend server can begin processing one or more portions of the audio input data prior to the user having completed making the instructions. Thus, the backend server can start analyzing whatever portion of the audio input data it received through a variety of techniques such as automatic speech recognition (ASR) and natural language understanding (NLU) to convert the audio input data into a series of identifiable words, and then to analyze those words in order to interpret the meaning of the request from the user. The backend server can utilize ASR techniques to recognize the spoken words that were recorded and stored in the audio data and to translate them into known text that can then be analyzed by NLU techniques to attempt to decipher the meaning of the request from user. Any suitable computer implemented speech-to-text technique may be used to convert the received audio signal(s) into text. In some embodiments, one or more filters may be applied to the received audio input data to reduce or minimize extraneous noise, however this is not required. In this example, analyzing the audio input data 106 can include determining refinement or initialization information "music I like," media type "song," and an instruction "play," to initialize the playback of media content. The backend server can then cause music associated with the initialization information to be played using the voice communications device. It should be appreciated that refinement information may also be utilized, such as a command to skip or a song or refine within a genre, such as "Alexa, play more like this song" or "Alexa, play new music like this".

Figure 2:
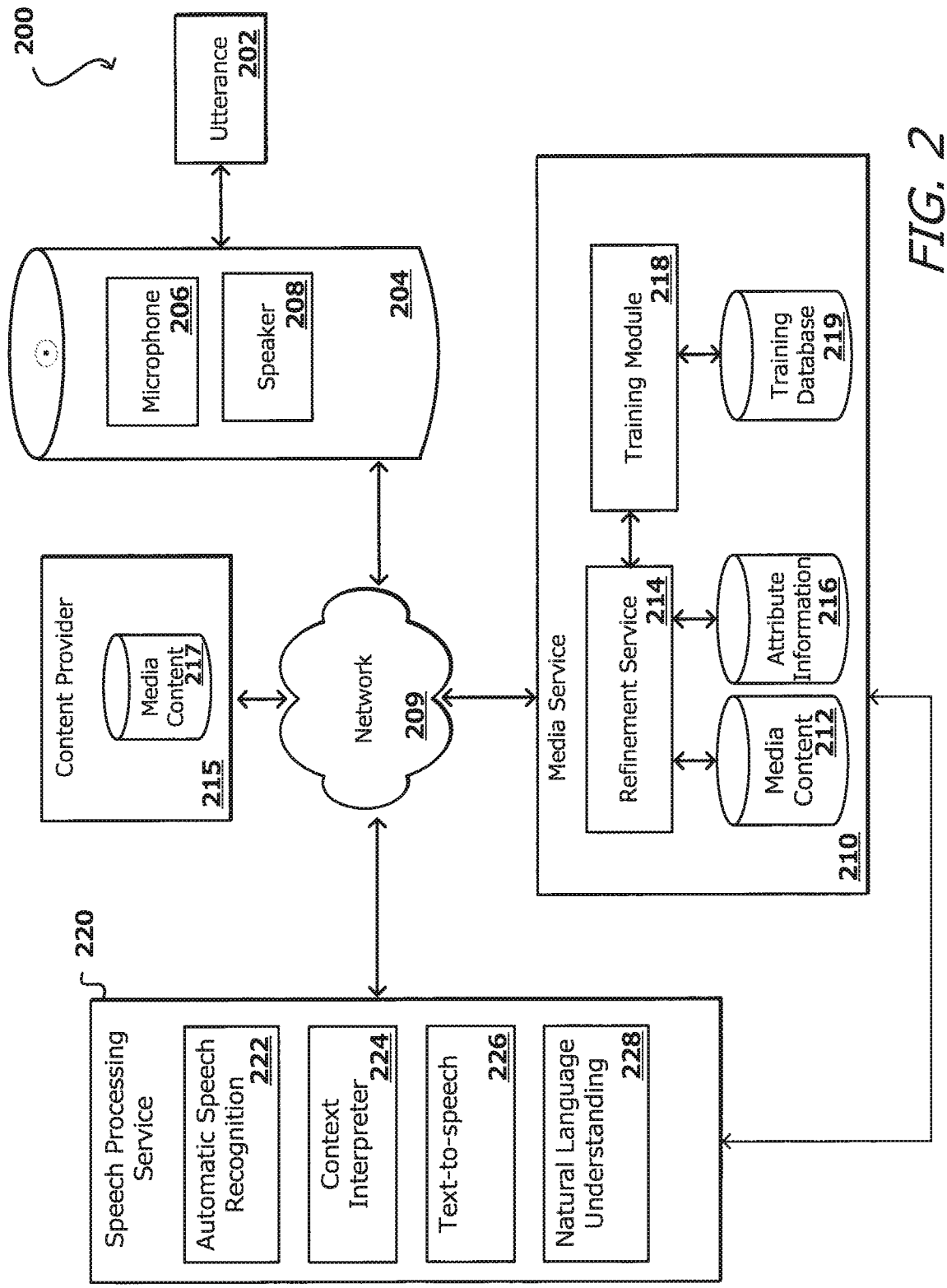
FIG. 2 illustrates an example system for controlling media playback using a voice communications device in accordance with various embodiments.

FIG. 2 illustrates an example system 200 controlling media playback using a voice communications device in accordance with various embodiments. In this example, system 200 shows example data flows between a speech processing service, a content provider, and a media service provider in response to receipt of user utterances. It should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein. The system 200 can include a computing device 204 (e.g., a voice communications device), a media service 210, a content provider 215, and a speech processing service 220. In this example, a user may make an utterance 202, such as an utterance that includes a spoken command for the speech processing service to perform some task, such as to initiate playback of media content. The user may speak the utterance into (or in the presence of) the voice communications device. The voice communications device 204 can correspond to a wide variety of electronic devices. In some embodiments, the voice communications device may be a computing device that includes one or more processors and a memory which may contain software applications executed by the processors. The voice communications device may include or be in communication with an audio input component for accepting speech input on which to perform speech recognition, such as a microphone 206. The voice communications device may also include or be in communication with an output component for presenting responses or other information from the speech processing service 220, such as a speaker 208. The software of the voice communications device may include hardware components and/or software for establishing communications over wireless communication networks or directly with other computing devices.

The media service 210 can correspond to an online service that provides access to media content, such as music, e-books, audio broadcasts, etc. In one example, the media service 210 can be associated with an online electronic marketplace that provides media content. Moreover, in some embodiments, the media service 210 can comprise one or more media libraries or databases 212. It is important to note that although shown as being included with the media service 210, in some embodiments, the one or more media libraries 212 can be separate from the media service 210. In other words, in some cases, the one or more media libraries 212 can reside on one or more servers external to one or more servers on which the media service 210 resides. For example, the media libraries can be stored in media content data store 217 provided by content provider 215. The content provider can be associated with media service 210 or can be a separate entity. The one or more media libraries 212, 217 can store, in part, data representative of media content. The data representative of media content can be accessible (e.g., downloading, streaming, etc.) to the voice communications device 204. The voice communications device 204 can acquire (e.g., download, stream, etc.) the data from the media service 210 and/or content provider 215 and, as a result, play the media content. The media content in the data store can be associated with refinement information/attribute information, metadata, and other such information stored in attribute data store 216. In accordance with various embodiments, a refinement can be an attribute used to update an active play queue of media content. For example, a refinement can be used to filter media content from an active play queue of media content, add media content to the active play queue of media content, re-order the sequence of content in the active play queue, supplement the active play queue, and/or change the frequency of playback of content in the play-queue. An attribute is generally received in an initial request for media content. The attribute(s) in the request can be used to determine media in a catalog of media matching those attributes. Metadata can include, for example, title, artist, album, track number, and other information about the media content. Refinement/attribute information can include, for example, mood, tempo, an activity or any other such information. A request with refinement/attribute instructions can include information to identify media content associated with a mood, a tempo, a genre, an artist, a year, a decade, an activity as well as any other information. As will be described further herein, a refinement service 214 can be used to filter media content from an active play queue of media content, add media content to the active play queue of media content, re-order the sequence of content in the active play queue, supplement the active play queue, and/or change the frequency of playback of content in the play-queue. In various embodiments, the refinement service, when managing an active play queue of media content, can rank or otherwise organize an order of media content playback for an active play queue, catalog of media, or other initial set of media content. In this approach, media content is not filtered or removed from an initial (or previously managed set of media content); rather, an order of playback of the media content is determined based on the refinement(s)/attribute(s) in a request for media content playback, and the order is used to playback the media content. Further, in embodiments, the refinement service 214 may store or otherwise track user access to individual content. For instance, the refinement service 214 may record each instance that a user requests access or otherwise interacts with certain media content. In embodiments, a history or profile may be developed in conjunction with the user account to better refine or predict user interaction with media content.

In various embodiments, the media service 210 may further include a training module 218 and a training database 219. One or more of the modules and databases described above may be implemented jointly or separated further into additional modules. The media service 210 may include one or more trained machine learning models, such as convolutional neural networks trained to determine various attributes of the accessible content. For instance, within the training module 218 a matching module may receive the attributes or features determined by the speech processing 220 described below and identify corresponding content from the media content 212, 217, which contains profiles for content, such as associated genres, artists, run times, year of production, and the like. The training module 218 may further associate data and attributes determined for the content. The training database 219 may store these associations and other training data. As users interact with the voice communications device 204, a history of their interactions may be generated and fed into the training module 218. Over time, the training module 218 may learn what type of content users interact with. For example, the training module 218 may learn that a user listens to a certain type of music at night before going to bed. Accordingly, if the user were to request music close to the time the user goes to bed, the training module 218 may recommend music similar to the music the user requests before bed. This training module 218 may further be utilized to learn what genres of music users enjoy, what type of movies the users enjoy, which items the users routinely purchase, and the like. Accordingly, each registered user associated with the voice communications device 204 may have their own unique training module 218 so that each user has a personalized experience.

The speech processing service 220 can receive a user utterance 202 via communication network 209. The speech processing service 220 can be a network-accessible service in communication with the voice communications device 204 via the communication network, such as a cellular telephone network or the Internet. A user may use the voice communications device 204 to submit utterances, receive information, and initiate various processes, either on the voice communications device or at the speech processing service 220. For example, as described, the user can issue spoken commands to the voice communications device 204 in order to control, refine, or otherwise manage the playback of media content.

The speech processing service 220 may include an automatic speech recognition (ASR) module 222 that performs automatic speech recognition on audio data regarding user utterances, a natural language understanding (NLU) module 228 that performs natural language understanding on transcriptions generated by the ASR module 222, a context interpreter 224 that applies contextual rules to current NLU results based on prior interpretations and dialog acts, a natural language generation ("NLG") module that converts certain dialog acts into user-understandable communications (e.g., text that can be "read" to the user by a text-to-speech 226 or "TTS" component), among other such modules.

The speech processing service 220 may include any number of server computing devices, desktop computing devices, mainframe computers, and the like. Each individual device may implement one of the modules or components of the speech processing service 220. In some embodiments, the speech processing service 220 can include several devices physically or logically grouped together to implement one of the modules or components of the speech processing service 220. For example, the speech processing service 220 can include various modules and components combined on a single device, multiple instances of a single module or component, etc. In one specific, non-limiting embodiment, the speech processing service 220 may include a server or group of servers configured with ASR and/or NLU modules 222, 228, a server or group of servers configured with a context interpreter 224 and/or a text-to-speech 226, etc. In multi-device implementations, the various devices of the speech processing service 220 may communicate via an internal communication network, such as a corporate or university network configured as a local area network ("LAN") or a wide area network ("WAN"). In some cases, the devices of the speech processing service 220 may communicate over an external network, such as the Internet, or a combination of internal and external networks.

In some embodiments, the features and services provided by the speech processing service 220 may be implemented as web services consumable via a communication network. In further embodiments, the speech processing service 220 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the features of the speech processing service 220 may be integrated into the voice communications device such that network connection and one or more separate computing systems are not necessary to perform the processes of the present disclosure. For example, a single voice communications device may include the microphone 206, the ASR module 222, the NLU module 228, the context interpreter 224, the text-to-speech 226 module, or some combination thereof.

As described, users may submit utterances that may include various commands, requests, and the like. The microphone 206 may capture utterance audio and provide it (or data derived therefrom) to the speech processing service 220. The ASR module 222 may generate ASR results for the utterance, such as a w-best list of transcriptions. Each transcription or portion thereof may be associated with some score, such as a confidence score or a likelihood that the transcription or portion thereof is correct. The w-best list or some other type of results may be provided to the NLU module 228 so that the user's intent may be determined. A w-best list of interpretations (e.g., intents) may be determined or generated by the NLU module 228 and provided to the context interpreter 224. The context interpreter 224 can process the NLU results (e.g., modify individual interpretations, filter interpretations, re-score or re-rank interpretations, etc.). The result can include refinement information used to refine a queue of media, information to determine media to playback, navigate, or otherwise control and/or select media.

In accordance with various embodiments, the result can be provided to the media service to refine and/or initiate playback of media content using the voice communications device. For example, the media service can determine whether there is an active play queue of media content playing on the voice communications device, such as a playlist of music. This can include, for example, accessing information associated with a user's account of the voice communications device. The information can indicate any active applications, such as media streaming applications and a state of such application. State information indicative of a state of a media streaming application can include, for example, information that indicates media content being played, the type of media content being played, whether there is an active queue of media content to be played, etc. In accordance with an embodiment, in the situation where there is no media content being played by the voice communications device, the media service determines media content to playback using information (e.g., the type of media content requested and any other information about the media content requested) in the request. The information can be used to search a catalog of media content stored in media content data store 210 or other such data store to identify media content to playback. The identified media content can thereafter be played using the voice communications device 204.

In the situation where there is an active play queue of media content, the information can be used to refine the play queue. For example, the result can include instructions such as refinement instructions that can be used by the refinement service 214 to filter media content from an active play queue of media content, add media content to the active play queue of media content, re-order the sequence of content in the active play queue, supplement the active play queue, and/or change the frequency of playback of content in the play-queue. As described, the media content is associated with refinement information, metadata, and other such information. The refinement instructions or other such information determined in the utterance can be compared to corresponding information associated with the media content to determine media content that matches the refinement instructions to at least a threshold level. In accordance with an embodiment, the determined media content can be used to filter (e.g., remove) and/or add media content to the active play queue and the media service can cause the media content associated with the updated active play queue to be played using the voice communications device.

In accordance with an embodiment, the refinement service can additionally or alternatively rank or otherwise re-order media content playback for an active play queue, catalog of media, playlist, or other set of media content. In this approach, media content is not filtered and/or removed from an initial (or previously managed set of media content); rather, an order of playback of the media content is determined based on the refinement(s)/attribute(s) in a request for media content playback, and the order is used to playback the media content. For example, in the situation where the active play queue includes "90's Alternative Rock" media content that included the full 90's-era works of Pearl Jam, among others, a request to "Play more Pearl Jam" wouldn't add media content to the active play queue (it already contains all of pearl jam), but could move Pearl Jam to take up more spaces at the current position of the active play queue, and/or add duplicates further down so that Pearl Jam continues to play at a high rate compared to other media content in the active play queue.

In accordance with an embodiment, the refinement service can supplement the active play queue. A refinement request to trigger supplementing the play queue can include, for example, "play more of a particular artist, genre, band, or other such entity," "mix in a particular artist, genre, band, etc.," or another such request. In this situation, media content matching the request is mixed into the active play queue, playlist, etc. with the media content already in the active play queue. Mixing media content into the play queue can include, for example, adding media content such that the added media content is played in accordance with a predetermined playback frequency. An example playback frequency is one mixed in song for every three songs. In an example use case, a voice communications device can receive a first request to play a jazz station. In response to the first request, the voice communications device can play a smooth jazz station or other similar station. The voice communications device can receive a second request to play less of a first artist (e.g., Kenny G) and only music in a particular decade (e.g., 80s.) In response to the second request, a predetermined number of Kenny G. songs can be filtered, leaving some Kenny G. and other smooth Jazz songs from the 80s in the active play queue. The voice communications device can receive a third request to play more of a second artist (e.g., Miles Davis). In response to the third request, the catalog of media content can be searched to determine Miles Davis songs from the 80s. The songs can be selected based on popularity of the song or some other characteristic. The selected Miles Davis songs can be mixed in with the other media content. The order of the songs (Miles Davis and other media content) can be re-arranged to favor, for example Miles Davis. This can include one or more of initiating playback with a Miles Davis song, playing back the media content in a predetermined ratio of media content (e.g., one of four songs is a Miles Davis song), etc. The resulting station is a user personalized 80s smooth jazz ply Miles Davis station.

In accordance with various embodiments, in response to updating the active play queue, the voice communications device can communicate interaction details of the update via a speaker of the voice communications device and/or to a companion app of the voice communications device. For example, after the first request is processed, the voice communications device can communicate that a smooth jazz station is playing. In another example, after the second request is processed, the voice communications device can communicate that Kenny G songs are filtered out and smooth jazz songs from the 90s and later are filtered out. In yet another example, after the third request is processed, the voice communications device can communicate that a certain number of Miles Davis songs have been mixed into the active play queue. It should be noted that other interaction details can be communicated via the voice communications device. These can include, for example, an interaction detail communicating the number of songs left in an active play queue in response to the refinement request to play more mellow music, an interaction detail communicating an amount of media content added to a play queue, an interaction detail communicating that the refinement was treated as a new request, an interaction detail communicating media content currently playing, in the active play queue/playlist/station, etc., among other such interaction details.

In the situation where no media content is identified to playback on the voice communications device, the result can be provided to the text-to-speech 226 component which can translate a semantic response into human-readable text, synthesized speech, etc. The translated response can be provided to the voice communications device and played using the voice communications device.

Figure 3:
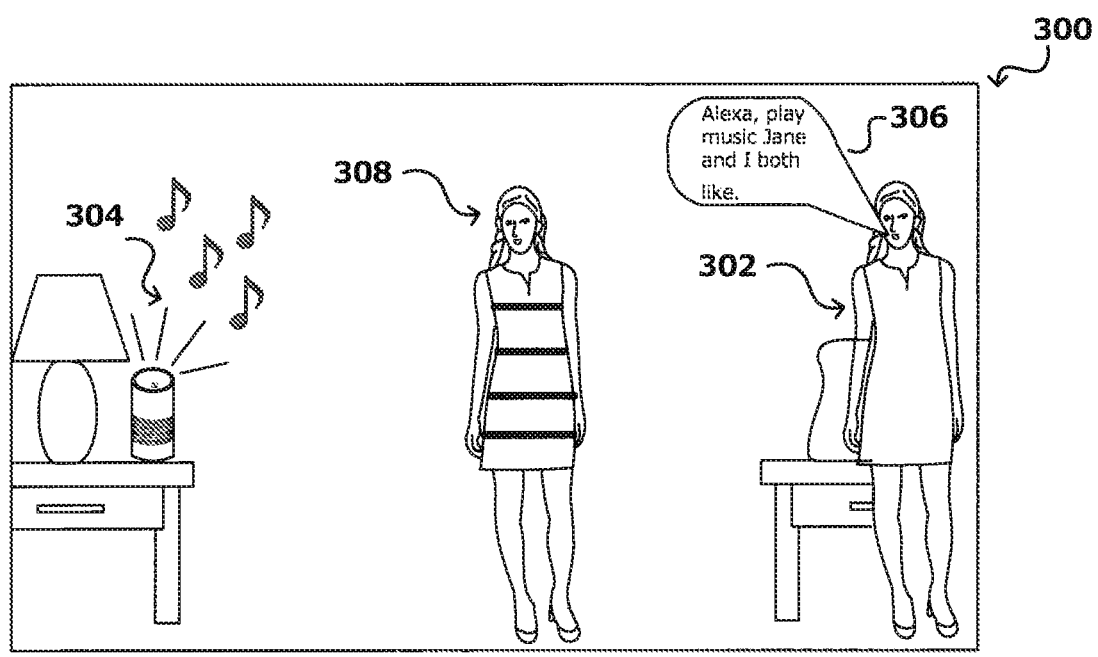
FIG. 3 illustrates an example environment in which aspects of the various embodiments can be utilized.

FIG. 3 illustrates an example environment 300 wherein a first user 302 is interacting with a voice communications device 304, such as the voice communications device 104 described in detail with respect to FIG. 1. The first user 302 provides a command 306 to the voice communications device 304 to play music that both the first user 302 and a second user 308 will enjoy. In embodiments, the voice communications device 304 may query the first user 302 to identify who "Jane" or "both" represents. That is, the voice communications device 304 may respond with a question to the first user 302 to obtain additional information in order to process the request. Additionally, in various embodiments, the voice communications device 304 may have already identified the first user 302 and the second user 308 based on previously recorded or obtained information. For instance, the first and second users 302, 308 may have been speaking in the room prior to the first user 302 issuing the command 306. The voice communications device 304 may have received information from each of the first and second users 302, 308 and accessed user accounts corresponding to each of the first and second users 302, 308. Additionally, in embodiments, the voice communications device may identify the first user 302 and/or the second user 308 using other methods. For instance, voice communications device 304 may recognize a user device corresponding to the first and/or second users 302, 308 via BLUETOOTH™ or some near-field communication protocol. Furthermore, the users 302, 308 may have an application stored on a user device that enables the user device to communicate with the voice communications device 304. Additionally, in various embodiments, the voice communications device 304 may include a camera or other image capture device that enables the voice communications device 304 to receive an image of the users 302, 308 and thereafter determine accounts associated with the user, for example, based on image recognition protocols that may be utilized by the voice communications device 304. Furthermore, in embodiments, biometrics, such as finger prints identification, may also be utilized to identify the users 302, 308.

As described above, in various embodiments, the first and second users 302, 308 may have dissimilar tastes or preferences regarding media content. For example, the first user 302 may enjoy country western music while the second user 308 enjoys pop music. As such, playing content exclusively from a catalog of content or a training module associated with the first user 302 may lead to a poor experience for the second user 308, while playing media content exclusively from a catalog of content or a training module associated with the second user 308 may lead to a poor experience for the first user 302. However, because the voice communications device 304 has recognized each of the first and second users 302, 308, the voice communications device 304 may scan and analyze each catalog of content for the users 302, 308 and identify overlapping or similar content. Thereafter, the voice communications device 304 may generate a new combined catalog of content and begin media playback and refinement from the combined catalog of content, which contains media content that both the first and second users 302, 308 are likely to enjoy. Additionally, in embodiments, the voice communications device 304 may apply rules or information from the respective training modules for the users and thereafter utilize those rules or information to identify content both users would enjoy. It should be appreciated that while the above example discussed media content playback in the form of music, other content, such as movies, audiobooks, calendars, pictures, and the like may also be identified and played using similar techniques.

Figure 4:
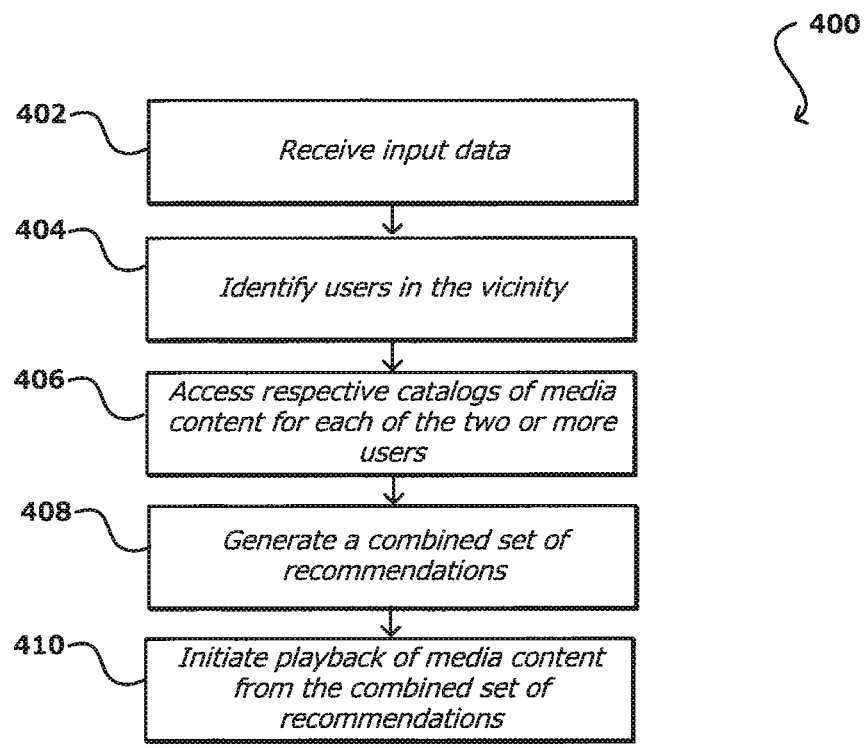
FIG. 4 illustrates an example process for content playback, in accordance with various embodiments.

FIG. 4 is a flow chart representing a method 400 for initiating playback. In various embodiments, a user or multiple users may request media content playback or be in proximity to one another when media content is requested. That is, the user or users may request playback for media content that will collectively be consumed by the two or more users. In various embodiments, the method 400 begins upon receipt of input data, such as audio input data, from the users 402. The one or some of the users may provide an utterance, such as "Alexa, play music both of us like" or "Alex, play music Jane and I both like" or "Alexa, play music everyone likes." As described above, the voice communications device may receive the input data, identify instructions from the input data, and proceed to execute the instructions. Because the initial utterance or command included a plural pronoun, the voice communications device may identify that more than one user is present. As such, the identity of the users in the vicinity of the device is obtained 404. For instance, the voice communications device may respond with a request, such as "Who is both of us?" or "Who is present?" or "Who is Jane?" or the like. The users may respond to enable the voice communications device to determine the users. Alternatively, or in addition, the voice communications device may be configured to listen to its surroundings. The two or more users may be discussing another topic, and the voice communications device may identify the two or more users before receiving the command. Also, as described above, other methods of identifying users such as near-field communication protocols, visual indicators, biometrics, and the like may also be used to identify the users associated with the command.

Next, catalogs of media content for each respective user are accessed 406. The catalog of media content may be associated with two or more authorized accounts corresponding to the users, such as a media streaming account or purchased media content. In various embodiments, one or more refinements may be applied to the respective catalogs upon access. For instance, if the user provided a command such as "Play rock music both of us will like" then upon accessing the respective catalogs of media content, media corresponding to "rock music" may be identified. Accordingly, processing resources may be conserved because rather than manipulating an entire catalog of media content in later steps, only media content corresponding to the instruction will be included. This will reduce processing and memory resource use. Upon identification of the catalogs of media content, a new set of recommendations is generated 408. In various embodiments, music may be recommended to the users, for example, based on prior listening history. Accordingly, the catalogs of music previously accessed by the users may be used to generate recommendations for music each user is likely to enjoy. For example, a combined catalog of media content may include media content that overlaps between the respective catalogs of the two or more users. Additionally, the combined catalog of media content may include media content that is predicted to be acceptable to each of the users, based for example on prior playback histories for each of the users. For example, in an embodiment where there are three users, if two of the catalogs of media content corresponding to two users include media content for the musical group "The Smiths" and a catalog of media content for a third user includes media content for the musical artist "Morrissey" it is likely that the media content corresponding to each of "The Smiths" and "Morrissey" will be enjoyed by all of the users because the artist "Morrissey" is the lead singer of "The Smiths". After the combined set of recommendations is generated, playback from the set of recommendations may begin 410. In this manner, multiple catalogs of media content from multiple users may be analyzed, compiled, and utilized for media playback such that each of the users will likely be happy with the selection of media content.

Figure 5:
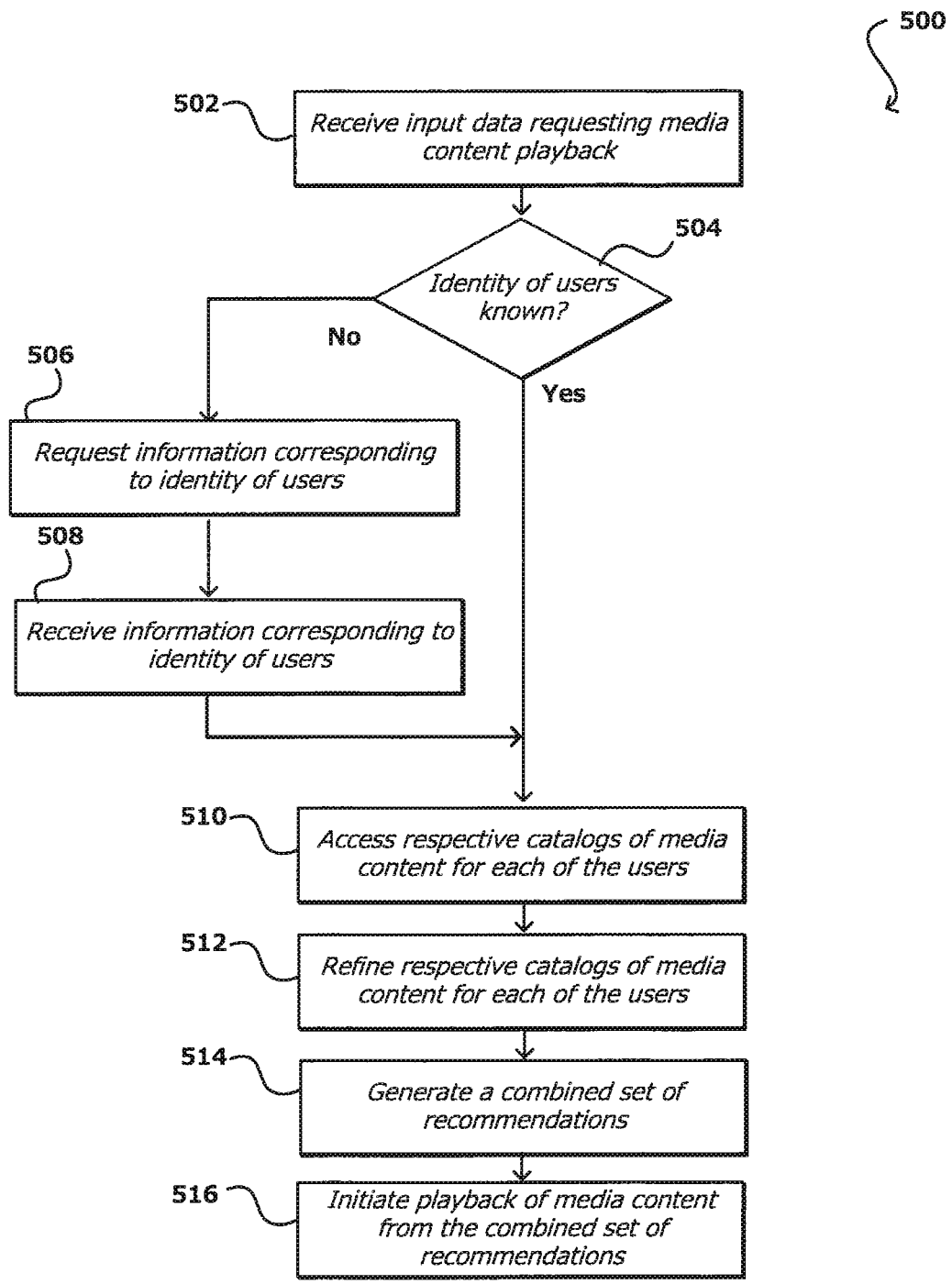
FIG. 5 illustrates an example process for content playback, in accordance with various embodiments.

FIG. 5 is a flow chart representing a method 500 for initiating playback. In various embodiments, a first user may request playback of media content that will be viewed or heard by multiple other users. The method 500 beings with the voice communications device receiving input data requesting media content playback 502. For example, the input data may correspond to audio data, such as the first user speaking a command or utterance. In certain embodiments, the first user may issue a command such as "Alexa, play something we will all enjoy" or "Alexa, play rock music we both like" or "Alexa, play new music for all of us". As described above, these commands may be analyzed and thereafter the voice communications device may determine more than one user is present or will interact with the media content playback. Next, the voice communications device may check to determine whether an identity of each of the users is known 504. For example, the voice communications device may analyze previous utterances to determine whether multiple users have been identified. In certain embodiments, the identity of each user may not be known, and the voice communications device may request information corresponding to the identity of the users 506. For example, the voice communications device may respond to the command with a question such as "Who is in the room?" or "Who is all of us?" or "Who is both?" and the like. In embodiments, the user may supply an answer to the 508 to thereby enable identification of each user.

When the voice communications device has identified each of the users, the respective catalogs of media content for each user are accessed 510. For example, the identify of each user may be correlated to a valid user account having certain authorizations to access media content as well as a history of previously accessed media content. In various embodiments, the history of accessed media content includes top artists, top genres, top titles, personalized playlists, and the like. Thereafter, each of the respective catalogs of media content are refined 512. This refinement may correspond to the command issued by the user, such as a command to identify a specific genre, mood, decade, or the like for the media content. Additionally, the refinement may include evaluating each respective catalog for overlapping, similar, or related media content, such as similar artists, genres, and the like. Thereafter, in the illustrated embodiment, a combined set of recommendations is generated 514. This combined set of recommendations may include media content from each of the respective catalogs of media content. Alternatively, or in addition, the combined media content may not be a newly created catalog, but rather, a playlist that accesses individual refined catalogs for each user. Then, the voice communications device may initiate playback of media content 516. Accordingly, the playback will include media content that is likely to be enjoyed by all users present, thereby increasing the user experience with the voice communications device.

Figure 6:
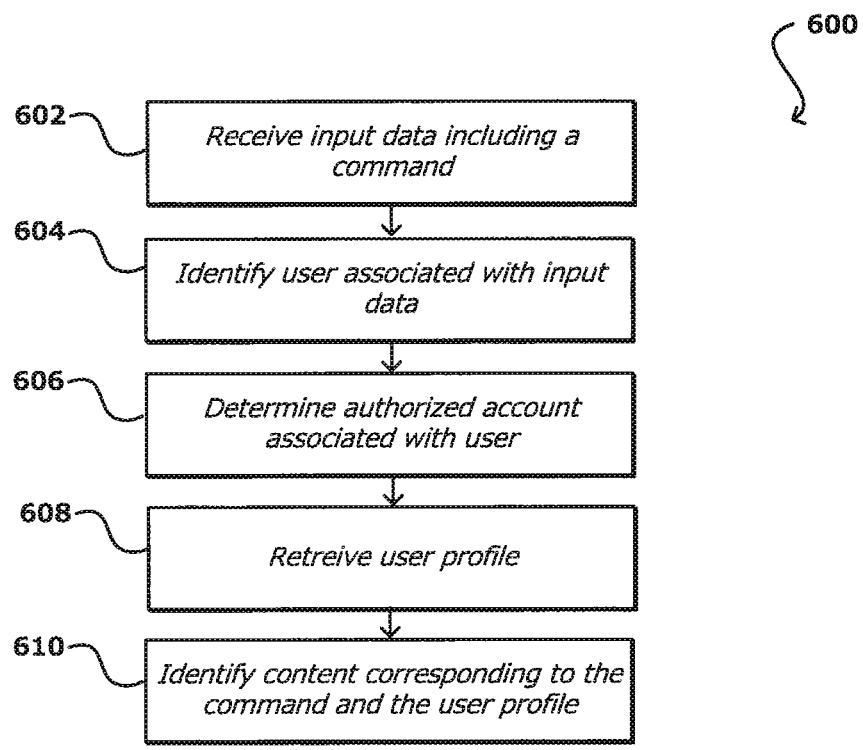
FIG. 6 illustrates an example process for content playback, in accordance with various embodiments.

FIG. 6 is a flow chart representing a method 600 for identifying content based on input data. In various embodiments, a user may issue a command to a voice communications device to retrieve or interact with some content. For instance, the user may ask the voice communications device to play music, a movie, load photos, add an item to a shopping cart, recite the user's calendar, or the like. In various embodiments, the voice communications device receives input data that includes a command to access content 602. This content may be available via the voice communications device, for example, via an authorized account for streaming music or movie services. The system identifies the user associated with the input data that includes the command 604. For example, the voice communications device may utilize voice recognition, near field communication, biometrics, or the like to identify the user associated with the command. It should be appreciated that the input data with the command may be an auditory command, an electronic command issued through an application on a user device, or the like. Next, the voice communications device may determine an authorized account associated with the user 606. For example, the authorized account may be preloaded on the voice communications device or otherwise associated with the voice communications device. In various embodiments, the authorized account enables access to content, such as movies, music, calendars, shopping carts, and the like. Additionally, the authorized account may be associated with a trained content model, such as the training module described above. The trained content model may track content accessed by the user, for example within a user history, and develop user preferences or a user profile associated with the content accessed by the user. Thereafter, the trained content model may recommend content to the user based on prior consumption. Next, the user profile is retrieved 608. In various embodiments, the user profile is generated by the trained content model and includes user preferences that enable predictions and/or identification of content the user has previously enjoyed or is likely to enjoy. Thereafter, content can be identified that corresponds to the command and at least in part to the user profile 610. In various embodiments, the command may include initiating playback of the content, in which case, the voice communications device may initiate playback. It should be appreciated that further input data may be provided to refine the content or the manner in which the content is presented, such as increasing volume, changing media being played, and the like.

Figure 7:
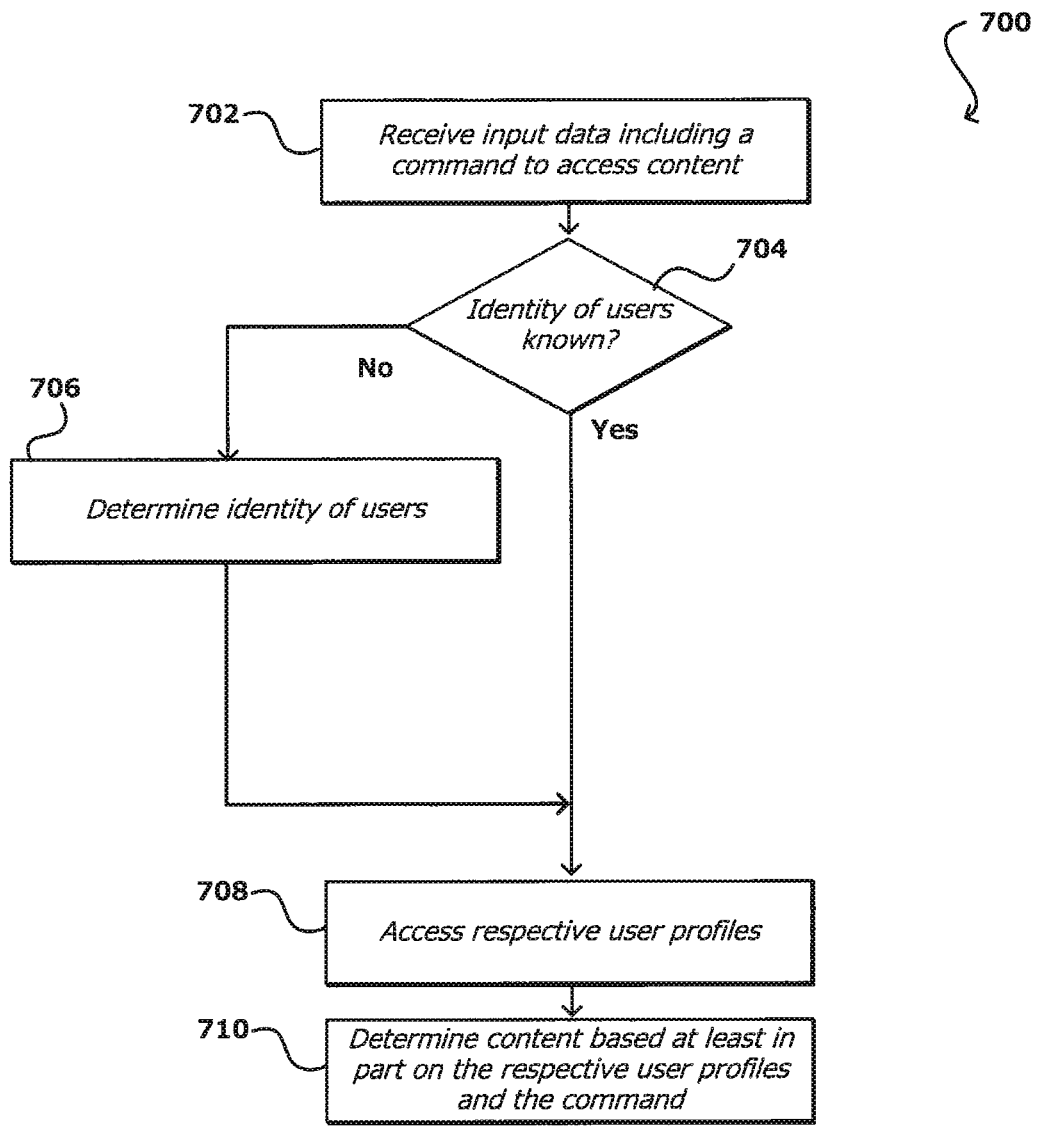
FIG. 7 illustrates an example process for content playback, in accordance with various embodiments.

FIG. 7 is a flow chart of a method 700 for identifying content for playback. In various embodiments, more than one user may be present to consume content from the voice communications device. It may be advantageous to identify content that all users will enjoy, thereby improving the usage experience for all users. The method begins by receiving input data including a command 702. This command may be a request to access a certain type of content, such as music, movies, audiobooks, or the like. In various embodiments, a user may present the command to the voice communications device as an auditory input, such as "Alexa, play music we'll both like." As shown, the command includes a plural pronoun, and upon evaluation, the voice communications device may determine that more than one person is in the vicinity. The voice communications device thereafter determines if it knows the identity of all users in the vicinity 704. For example, the voice communications device may identify the users based on their voice. Additionally, other identification method such as biometrics, logging in through an application on a user device, or near field communication protocols may also be used. If the voice communications device does not know the identity of the users, it may determine the identity of the users 706. In various embodiments, the voice communications device may issue a request to the users, such as "Who is both?" or "Who is we?" Additionally, in embodiments, the voice communications device may access previously obtained auditory input within a time frame, analyze the data, and identify users from that time frame. Upon determination of the users, the voice communications device may access respective user profiles for the users 708. For example, there may be a first user having a first user profile, which may be generated by a trained content model as described in detail above. Additionally, there may be a second user having a second user profile, which may be generated by a second trained content model as described in detail above. Accordingly, the voice communications system may gain access to a series or rules and/or preferences associated with each user in the vicinity.

Next, content may be evaluated in view of the command the respective user profiles 710. For example, the first profile may be associated with a series of rules or preferences regarding particular content, as may the second profile. In an embodiment, the first profile may have rules such as "No country western" and "No music before 1920." Additionally, the first user profile may have preferences, such as "Pop hits from the 2000s" and "Dance music". The second profile, on the other hand, may have rules such as "No rap" and "No heavy metal." Also, the second user profile may include preferences such as "Music above 120 beats per minute" and "Music from 2000 to now." Accordingly, if the command was "Alexa, play music we'll both like," the voice communications device may utilize the respective profiles to no select certain music, such as country western or rap, and to select music both users will enjoy, such as recent, high speed, dance hits. In this manner, the user profiles may be utilized to determine content all users in the vicinity of the voice communications device may enjoy.

Figure 8:
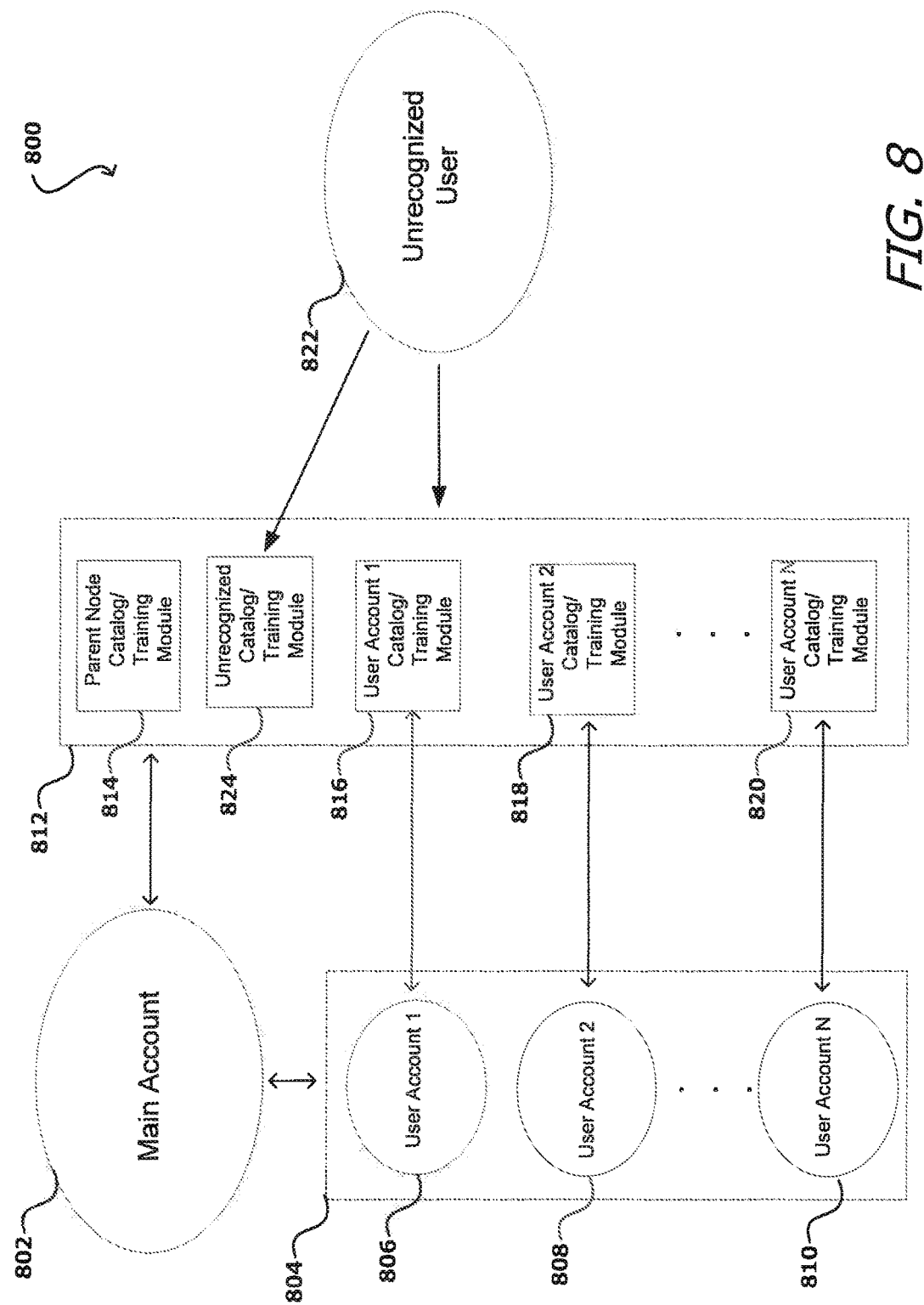
FIG. 8 illustrates an example system environment in which aspects of the various embodiments can be utilized.

FIG. 8 is a schematic diagram of a user environment 800. In various embodiments, the voice communications device may include a processor and memory, which may be utilized to store one or more user accounts. In embodiments where the voice communications device includes more than one user account, a parent node or main account may be designated. This parent node may control one or more settings of the voice communications device, such as providing authorization to access certain content, adding additional user accounts, or making purchases. The parent node may control or otherwise have access to an account list 804 including a plurality of user accounts 806, 808, and 810. As illustrated, account 806 may correspond to User Account 1, account 808 may correspond to User Account 2 and account 810 may correspond to User Account N, where N is any reasonable number of user accounts. In embodiments, the accounts may be referred to as child nodes or the like. In the illustrated embodiment, the child nodes are associated with the parent node such that the parent node can control or limit access for the child accounts. For example, the accounts illustrated in FIG. 8 are associated with a content library/training module library 812. The content library/training module 812 may include all of the content accessible by the accounts associated with the voice communications device. Moreover, each account may have a dedicated or otherwise associated catalog. For example, a parent node catalog 814 is associated with and accessible by the parent node 802. Similarly, each user account 806, 808, 810 has an associated user account catalog/training module 816, 818, 820. Additionally, various embodiments, the content library/training module 812 may include the training modules associated with each respective user account, which may be utilized to generate the user profiles. As shown, there are restrictions placed on the user accounts 806, 808, 810 such that the respective user accounts 806, 808, 810 can only access their associated catalog/training module 816, 818, 820. This may be utilized to effectively limit access to certain types of content, for example explicit content may be filtered or inaccessible to children. For example, if the content library 812 includes movies with an "R" rating or music content with explicit lyrics, the parent node 802 may be utilized to block access from the User Account 2 808, which may be associated with a child. As a result, the content may be accessible via the voice communications device 802 and remain in the library 812, but certain users may be blocked from accessing the content.

As described above, in certain embodiments one or more of the users interacting with the voice communications device may not be an authorized user or may be an unrecognized user 822. Accordingly, if an unrecognized user submits a request the voice communications device may not effectively filter the content to match the criteria specified because the voice communications device may not be able to access a catalog for the unrecognized user. In the illustrated embodiment, the unrecognized user is provided access to the entire library 812. However, it should be appreciated that in other embodiments unrecognized users may be provided access to limited portions of the library. For example, the unrecognized user may be restricted to the parent node catalog 814, one of the user account catalogs/training modules 816, 818, 820, or some combination thereof. Accordingly, if the user submitted a request such as "Alexa, play something we'll both like" and one of the users was an unrecognized user, the voice communications device would utilize the account associated with the user speaking and the entire library of media content in order to filter and identify content associated with both the library and the speaking user's account. In other words, the voice communications device will be provided with a catalog in order to generate the combined catalog described above. Additionally, in the illustrated embodiment, the library 812 may include an unrecognized catalog/training module 824 to receive and store the requests from the unrecognized user 822. For example, in embodiments where the unrecognized user 822 provides an input command, the unrecognized training module 824 may include the command in the history associated with unrecognized users to thereby identify patterns or preferences for the unrecognized users. Storing this information may be advantageous because unrecognized users may be repeat users, such as friends that visit the authorized user's home often, so storing their preferences may enable improved experiences for both the authorized user and the unrecognized user.

In certain embodiments, the voice communications device may track or otherwise compile a history of media content use by the authorized users. This history may then be used to provide improved recommendations. In various embodiments, the voice communications device may disregard the history when an unrecognized user is included or store it separately, such that the content usage will not impact the catalogs or training modules for authorized users. Accordingly, unrecognized users will not influence histories for registered users. For example, if a registered user were having a party with multiple people and different persons made requests to the voice communications device, these requests would not influence or change the recommendations for the authorized user.

Figure 9:
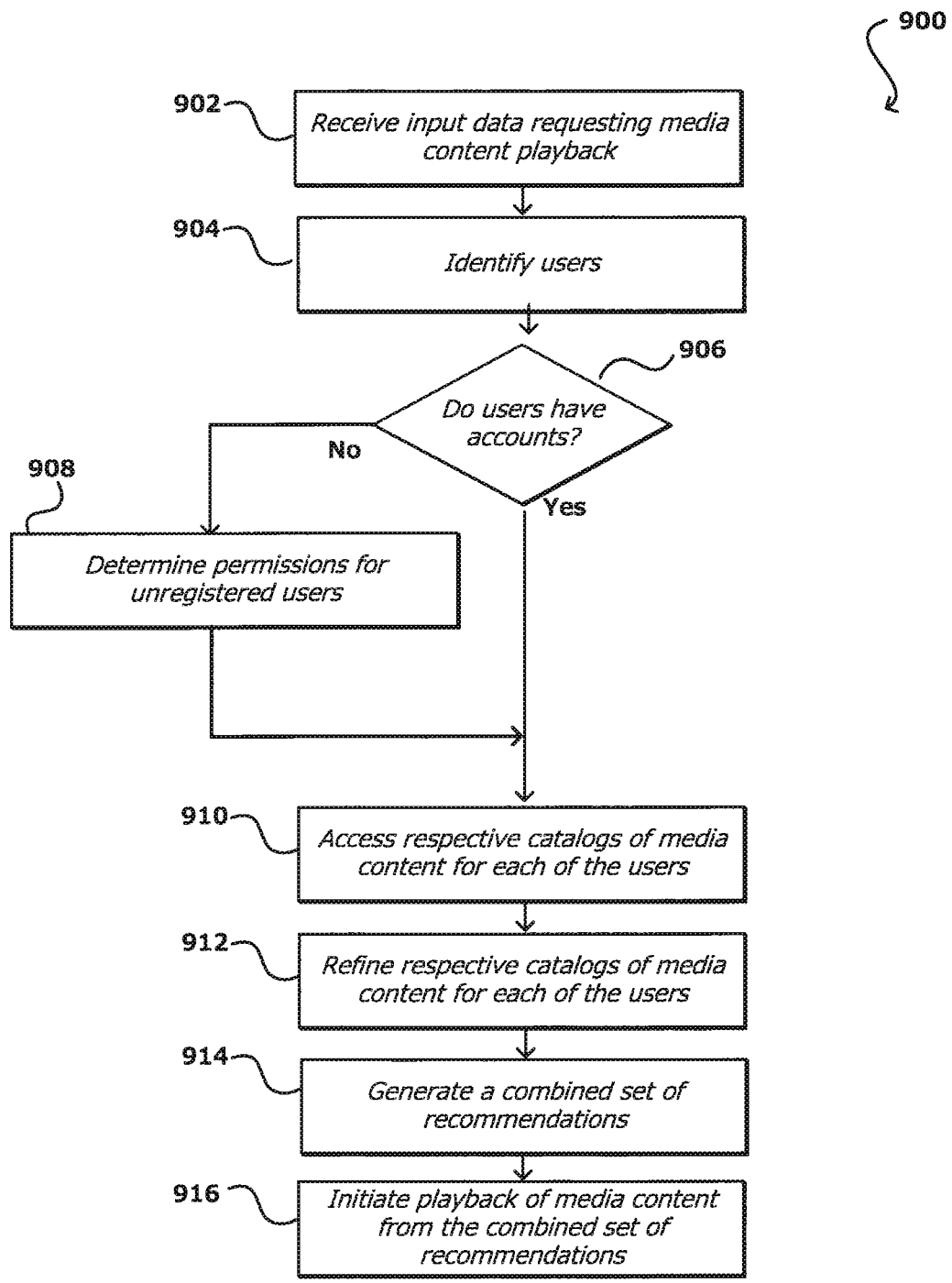
FIG. 9 illustrates an example process for content playback, in accordance with various embodiments.

FIG. 9 is a flow chart of an embodiment of a method 900 for initiating media content playback. The method begins 900 when input data requesting media content playback is received 902. For example, a user may provide a command or an utterance to the voice communications device. Additionally, an application on a user device, a remote control, or another input method may be utilized to provide the input data. Upon receipt of the input data, the identity of the users may be obtained 904. For example, the voice communications device may identify the users based on voice recognition software for an audio utterance. The voice communications device may ask a question so that the user provides the identity of each user present, or the voice communications device may utilize previously obtained auditory or visual data to identify the users. Thereafter, the voice communications device may determine whether the users have registered accounts 906. The accounts may be accessible by the voice communications device and may be associated with a catalog of media content and/or one or more services to provide streaming or purchasable media content. If the users do not have an account, the voice communications device may determine which permissions the unregistered users have 908. These permissions may be associated with a main account or parent node of the voice communications device. The permissions may grant access to one or more content catalogs within a library of content catalogs associated with the accounts of the voice communications device.

Next, the respective content catalogs are accessed for each of the users 910. These content catalogs may be associated with and accessible by a particular user, or the content catalogs may be accessible by multiple users. Thereafter, the content catalogs are refined based at least in part on the input data 912. For example, refinement may include determining similar or overlapping media content between the respective catalogs for each user. Moreover, refinement may include identifying content by one or more attributes, such as genre, title, artist, or the like. Then, a combined set of recommendations is generated 914. This combined set of recommendations may include media content from each of the respective catalogs. Thereafter, playback from the combined set of recommendations is initiated 916. Accordingly, multiple users may collectively experience media content playback including media they are likely to enjoy based on their own media preferences.

Figure 10:
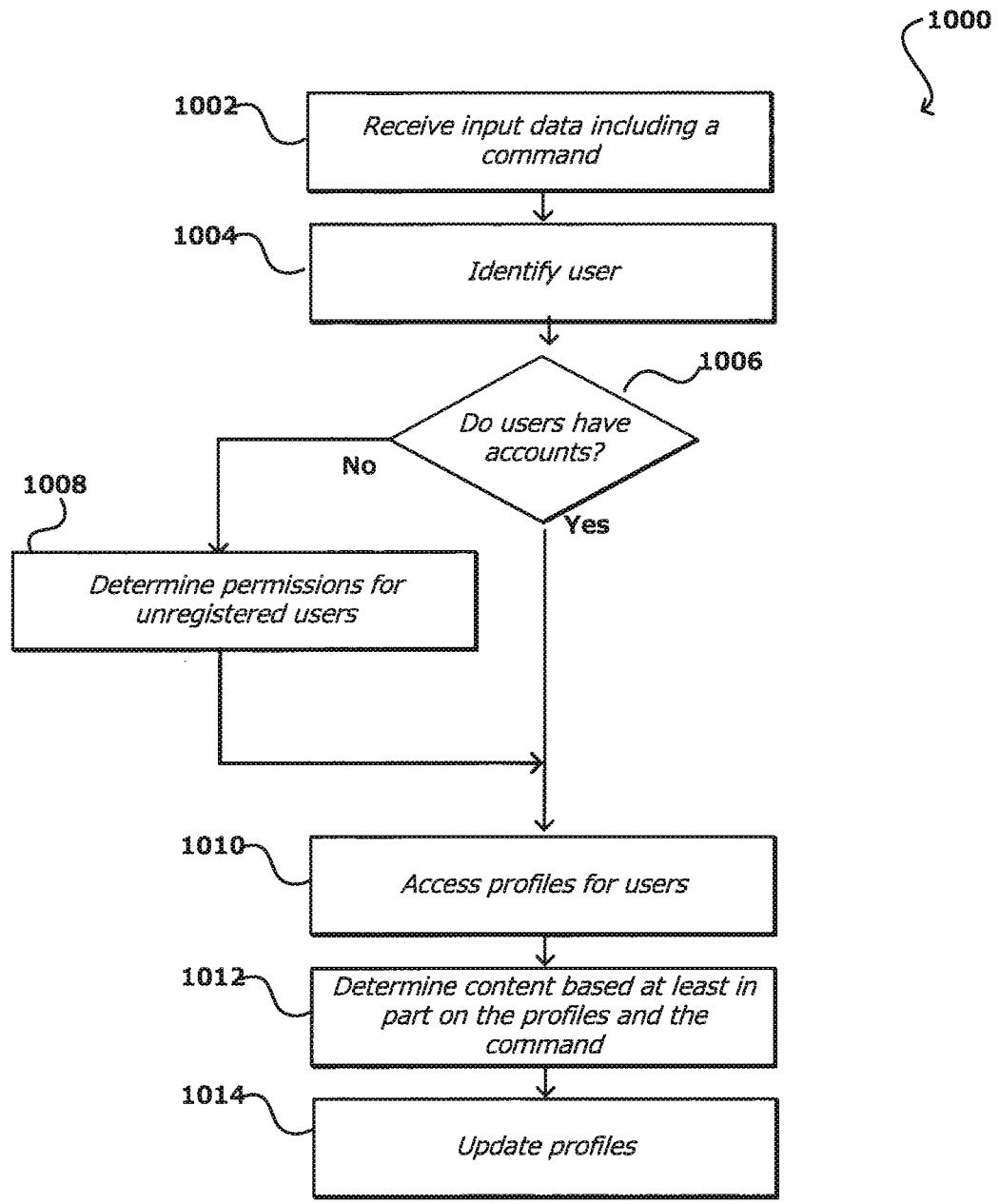
FIG. 10 illustrates an example process for content playback, in accordance with various embodiments.

FIG. 10 is a flow chart of a method 1000 for content identification and playback. The method 1000 begins when the voice communications device receives input data including a command 1002. For example, the input data may be an auditory command to play a particular type of music. Thereafter, the input data is used to identify a user associated with the command 1004. In various embodiments, the user may be identified through voice recognition, an account log in through an application on a user device, near field communication protocols, and the like. Upon identification of the user, the method determines if the user has an account 1006. For example, users may be associated with authorized accounts that have permission to access various content, such as media and the like. The accounts may be preloaded onto the voice communications device, or may be retrieved over a network from a remote database or server. If the user is does not have an account, an unrecognized user training module is accessed 1008. As described above, the unrecognized user training module may record commands from unrecognized users in order to develop a history or preferences associated with unrecognized users. In various embodiments, unrecognized users may be repeat users, such as friends of recognized users, and developing profiles associated with unrecognized users may provide an improved experience. If the user has an account, then a user profile for the user is accessed 1010. For example, the user profile may be generated by the training module and include preferences, histories, or the like associated with content accessed by the user.

Next, the method processes the command using the respective profiles to identify content 1012. For example, in various embodiments, the rules or preferences from the authorized user profile and the unrecognized user profile may be utilized to identify content satisfactory to both accounts. That is, the content identified will not directly correspond with specific rules related to undesirable content. For instance, if the authorized user profile included a rule for "No country western music" then the content selected from the authorized user profile and the unrecognized user profile will not include country western music, regardless of the affinity of the unrecognized user profile for country western music. In this manner, content may be selected using information from a variety of training modules. Thereafter, the training modules may be updated 1014. For example, the unrecognized user profile may be updated to include the newly identified content. In various embodiments, the authorized user profile will not be updated based on request or commands from the unrecognized user. That is, unrecognized user selections will not influence the profiles for authorized users. Accordingly, authorized users can freely enable visitors to utilize the voice communications device without impacting their future recommendations and content selection.

Figure 11:
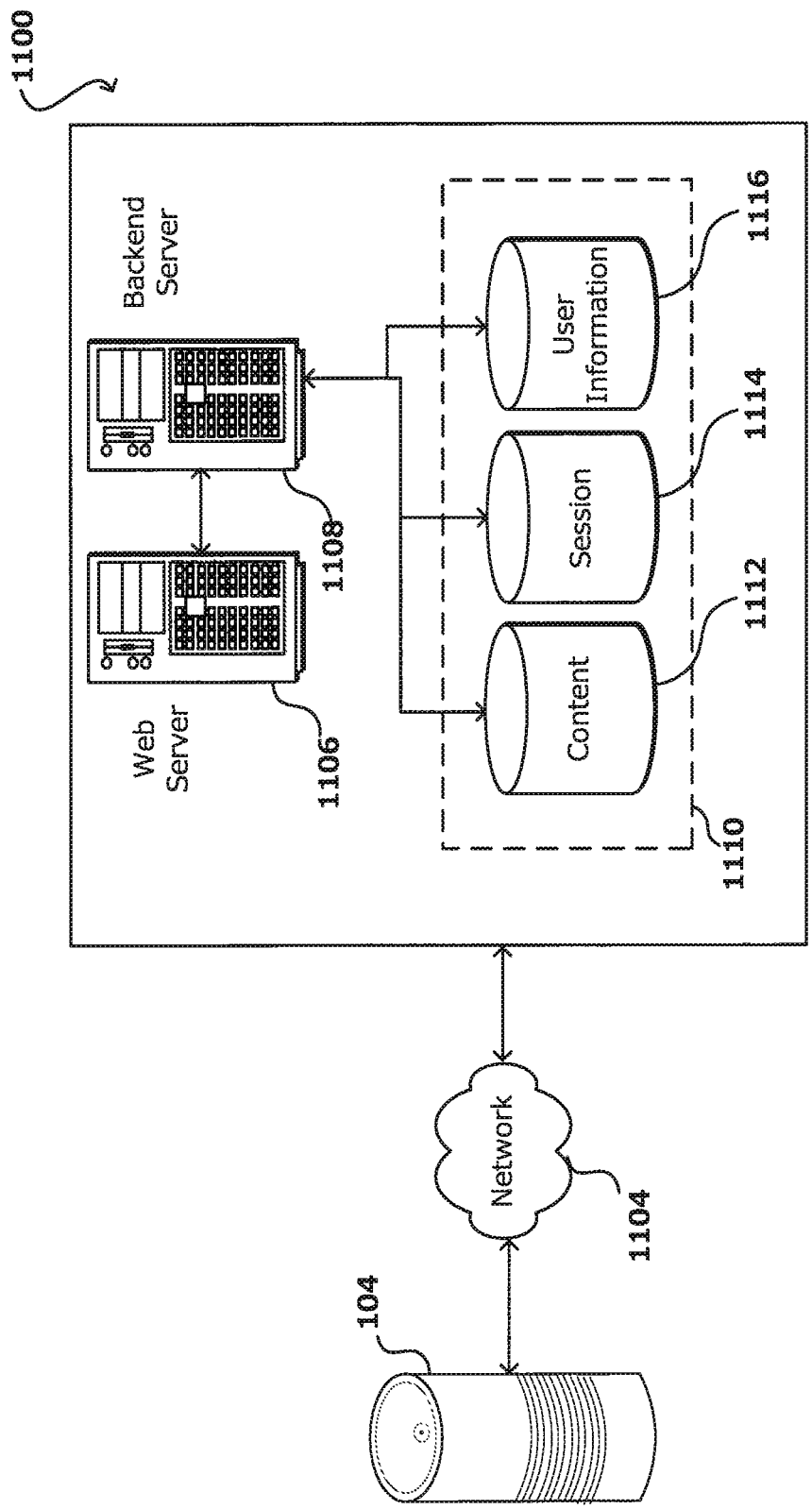
FIG. 11 illustrates an example environment in which various embodiments can be implemented.

In accordance with various embodiments, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes voice communications device 104, which can include any appropriate device operable to send and receive requests, messages or information over network 1104 and convey information back to an appropriate device. The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one backend server 1108 and a data store 1110. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 1108 can include any appropriate hardware and software for integrating with the data store 1110 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 1106 in the form of HTML, XML or another appropriate structured language in this example. The handling of all requests and responses, as well as the delivery of content between the voice communications device 104 and the backend server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be other information that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the backend server 1108 and obtain, update or otherwise process data in response thereto. In one such example, the voice communications device can receive a request to refine the playback of media content, such as music, news, audio books, audio broadcasts, and other such content. In this case, the data store might access the user information to verify the identity of the user and access a media service to determine media content the user is associated with. The user's speech can be analyzed and used to generate an updated active play queue or initiate the playback of media content.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

Figure 12:
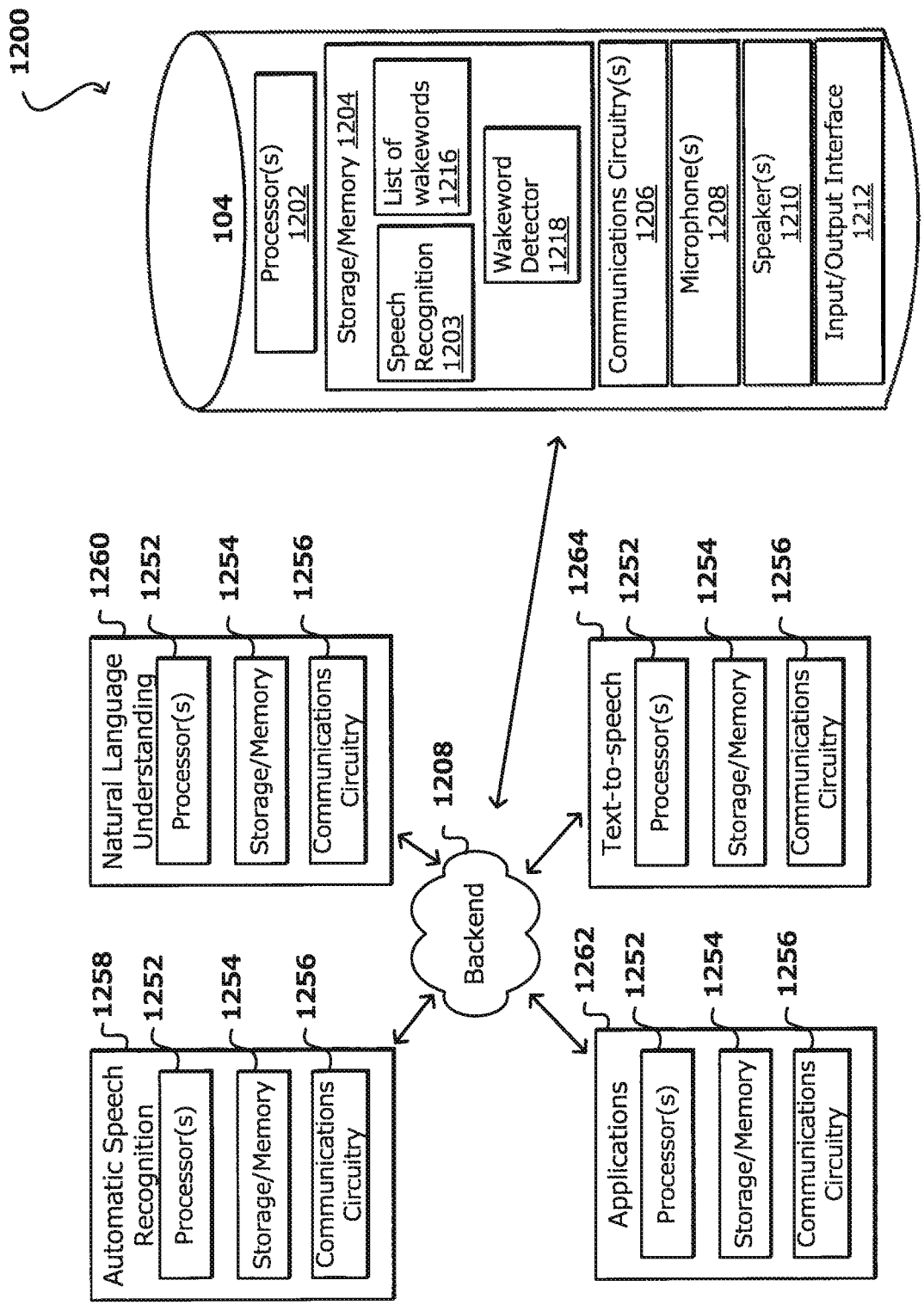
FIG. 12 illustrates an example for sending electronic communications between electronic devices.

FIG. 12 is another example environment 1200 for implementing aspects in accordance with various embodiments. In this example, voice-enabled communications device 104, in some embodiments, may correspond to any type of electronic device capable of being activated in response to detecting a specific sound. Voice-enabled communications device 104 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. In some embodiments, voice-enabled communications device 104 may be relatively simple or basic in structure such that no mechanical input option(s) (e.g., keyboard, mouse, trackpad) or touch input(s) (e.g., touchscreen, buttons) may be provided. For example, voice-enabled communications device 104 may be capable of receiving and outputting audio, and may include power, processing capabilities, storage/memory capabilities, and communication capabilities.

Voice-enabled communications device 104 may include a minimal number of input mechanisms, such as a power on/off switch, however primary functionality, in one embodiment, of voice-enabled communications device 104 may solely be through audio input and audio output. For example, voice-enabled communications device 104 may listen for a wakeword by continually monitoring local audio. In response to the wakeword being detected, voice-enabled communications device 104 may establish a connection with backend server 1108, send audio input data to backend server 1108, and await/receive a response from backend server 1108. In some embodiments, however, non-voice-enabled devices may also communicate with backend server 808 (e.g., push-to-talk devices).

Voice-enabled communications device 104 may include one or more processors 1202, storage/memory 1204, communications circuitry 1206, one or more microphones 1208 or other audio input devices (e.g., transducers), one or more speakers 1210 or other audio output devices, as well as an optional visual input/output ("I/O") interface 1212. However, one or more additional components may be included within voice-enabled communications device 104, and/or one or more components may be omitted. For example, voice-enabled communications device 104 may include a power supply or a bus connector. As another example, voice-enabled communications device 104 may not include a visual I/O interface. Furthermore, while multiple instances of one or more components may be included within voice-enabled communications device 104, for simplicity only one of each component has been shown.

Processor(s) 1202 may include any suitable processing circuitry capable of controlling operations and functionality of voice-enabled communications device 104, as well as facilitating communications between various components within voice-enabled communications device 104. In some embodiments, processor(s) 1202 may include a central processing unit ("CPU"), a graphic processing unit ("GPU"), one or more microprocessors, a digital signal processor, or any other type of processor, or any combination thereof. In some embodiments, the functionality of processor(s) 1202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 1202 may include its own local memory, which may store program modules, program data, and/or one or more operating systems. However, processor(s) 1202 may run an operating system ("OS") for voice-enabled communications device 104, and/or one or more firmware applications, media applications, and/or applications resident thereon.

Storage/memory 1204 may include one or more types of storage mediums such as any volatile or non-volatile memory, or any removable or non-removable memory implemented in any suitable manner to store data on voice-enabled communications device 104. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 1204 may be implemented as computer-readable storage media ("CRSM"), which may be any available physical media accessible by processor(s) 1202 to execute one or more instructions stored within storage/memory 1204. In some embodiments, one or more applications (e.g., gaming, music, video, calendars, lists, etc.) may be run by processor(s) 1202, and may be stored in memory 1204.

In some embodiments, storage/memory 1204 may include one or more modules and/or databases, such as speech recognition module 1203, list of wakewords database 1216, and wakeword detection module 1218. Speech recognition module 1203 may, for example, include an automatic speech recognition ("ASR") component that recognizes human speech in detected audio. Speech recognition module 1203 may also include a natural language understanding ("NLU") component that determines user intent based on the detected audio. Also included within speech recognition module 1203 may be a text-to-speech ("TTS") component capable of converting text to speech to be outputted by speaker(s) 1210, and/or a speech-to-text ("STT") component capable of converting received audio signals into text to be sent to backend server 1208 for processing.

List of wakewords database 1216 may be a database stored locally on voice-enabled communications device 104 that includes a list of a current wakeword for voice-enabled communications device 104, as well as one or more previously used, or alternative, wakewords for voice-enabled communications device. In some embodiments, user 102 may set or program a wakeword for voice-enabled communications device 104. The wakeword may be programmed directly on voice-enabled communications device 104, or a wakeword or words may be set by the individual via a backend server application (app) that is in communication with backend server 1208. For example, a user may use their mobile device having the backend server application running thereon to set the wakeword. The specific wakeword may then be communicated from the mobile device to backend server 1208, which in turn may send/notify voice-enabled communications device 104 of the individual's selection for the wakeword. The selected activation may then be stored in list of wakewords database 1216 of storage/memory 1204.

Wakeword detection module 1218 may include an expression detector that analyzes an audio signal produced by microphone(s) 1208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 1208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 1208. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled communications device 104 may then begin sending the audio signal to backend server 908 for detecting and responds to subsequent utterances made by a user.

Communications circuitry 1206 may include any circuitry allowing or enabling voice-enabled communications device 104 to communicate with one or more devices, servers, and/or systems. For example, communications circuitry 1206 may facilitate communications between voice-enabled communications device 104 and backend server 1208. Communications circuitry 1206 may use any communications protocol, such as any of the previously mentioned exemplary communications protocols. In some embodiments, voice-enabled communications device 104 may include an antenna to facilitate wireless communications with a network using various wireless technologies (e.g., Wi-Fi, Bluetooth, radiofrequency, etc.). In yet another embodiment, voice-enabled communications device 104 may include one or more universal serial bus ("USB") ports, one or more Ethernet or broadband ports, and/or any other type of hardwire access port so that communications circuitry 1206 allows voice-enabled communications device 104 to communicate with one or more communications networks.

Voice-enabled communications device 104 may also include one or more microphones 1208 and/or transducers. Microphone(s) 1208 may be any suitable component capable of detecting audio signals. For example, microphone(s) 1208 may include one or more sensors for generating electrical signals and circuitry capable of processing the generated electrical signals. In some embodiments, microphone(s) 1208 may include multiple microphones capable of detecting various frequency levels. As an illustrative example, voice-enabled communications device 104 may include multiple microphones (e.g., four, seven, ten, etc.) placed at various positions about voice-enabled communications device 104 to monitor/capture any audio outputted in the environment where voice-enabled communications device 104 is located. The various microphones 1208 may include some microphones optimized for distant sounds, while some microphones may be optimized for sounds occurring within a close range of voice-enabled communications device 104.

Voice-enabled communications device 104 may further include one or more speakers 1210. Speaker(s) 1210 may correspond to any suitable mechanism for outputting audio signals. For example, speaker(s) 1210 may include one or more speaker units, transducers, arrays of speakers, and/or arrays of transducers that may be capable of broadcasting audio signals and or audio content to a surrounding area where voice-enabled communications device 104 may be located. In some embodiments, speaker(s) 1210 may include headphones or ear buds, which may be wirelessly wired, or hard-wired, to voice-enabled communications device 104, that may be capable of broadcasting audio.

In some embodiments, one or more microphones 1208 may serve as input devices to receive audio inputs, such as speech. Voice-enabled communications device 104, may then also include one or more speakers 1210 to output audible responses. In this manner, voice-enabled communications device 104 may function solely through speech or audio, without the use or need for any input mechanisms or displays.

In one exemplary embodiment, voice-enabled communications device 104 includes I/O interface 1212. The input portion of I/O interface 1212 may correspond to any suitable mechanism for receiving inputs from a user of voice-enabled communications device 104. For example, a camera, keyboard, mouse, joystick, or external controller may be used as an input mechanism for I/O interface 1212. The output portion of I/O interface 1212 may correspond to any suitable mechanism for generating outputs from voice-enabled communications device 104. For example, one or more displays may be used as an output mechanism for I/O interface 1212. As another example, one or more lights, light emitting diodes ("LEDs"), or other visual indicator(s) may be used to output signals via I/O interface 1212 of voice-enabled communications device 104. In some embodiments, one or more vibrating mechanisms or other haptic features may be included with I/O interface 1212 to provide a haptic response to user 102 from voice-enabled communications device 104. Persons of ordinary skill in the art will recognize that, in some embodiments, one or more features of I/O interface 1212 may be included in a purely voice-enabled version of voice communications device 104. For example, one or more LED lights may be included on voice-enabled communications device 104 such that, when microphone(s) 1208 receive audio from user 102, the one or more LED lights become illuminated signifying that audio has been received by voice-enabled communications device 104. In some embodiments, I/O interface 1212 may include a display screen and/or touch screen, which may be any size and/or shape and may be located at any portion of voice-enabled communications device 104. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

FIG. 12 also includes backend server 1208, as mentioned previously, which may be in communication with voice-enabled communications device 104. Backend server 1208 includes various components and modules including, but not limited to, automatic speech recognition ("ASR") module 1258 (which may include, for example, speech-to-text ("STT") functionality), natural language understanding ("NLU") module 1260, applications module 1262, and text-to-speech ("TTS") module 1264. In some embodiments, backend server 1208 may also include computer readable media, including, but not limited to, flash memory, random access memory ("RAM"), and/or read-only memory ("ROM"). Backend server 1208 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used.

ASR module 1258 may be configured such that it recognizes human speech in detected audio, such as audio captured by voice-enabled communications device 104, which is then sent to backend server 1208. ASR module 1258 may include, in one embodiment, one or more processor(s) 1252, storage/memory 1254, and communications circuitry 1256. Processor(s) 1252, storage/memory 1254, and communications circuitry 1256 may, in some embodiments, be substantially similar to processor(s) 1202, storage/memory 1204, and communications circuitry 1206, which are described in greater detail above, and the aforementioned descriptions of the latter may apply. NLU module 1260 may be configured such that it determines user intent based on the detected audio received from voice-enabled communications device 104. NLU module 1260 may include processor(s) 1252, storage/memory 1254, and communications circuitry 1256.

Applications module 1262 may, for example, correspond to various action specific applications or servers capable of processing various task specific actions. Applications module 1262 may further correspond to first party applications and/or third party applications operable to perform different tasks or actions. For example, based on the context of audio received from voice-enabled communications device 104, backend server 1208 may use a certain application to perform an action, such refining an active play queue of media content. Applications module 1262 may include processor(s) 1252, storage/memory 1254, and communications circuitry 1256. As an illustrative example, applications module 1262 may correspond to a media service. The electronic media service application of the applications module 1262 can be associated with a customer account. The customer account can include at least one profile stored in, for example, user information that can be linked to the electronic media service application in applications module 1262. Audio input data can be received at automatic speech recognition module 1258 from voice communications device 104. The automatic speech recognition module 1258 can use automatic speech recognition (ASR) techniques on the audio input data to generate text data of the audio input data. The natural language understanding module 1260 can use natural language understanding (NLU) techniques on the text data to determine refinement/attribute information to manage the active play queue. The electronic media service application of the applications module 1262 can receive information that can be used to refine or otherwise control the playback of media content, where refining the playback of media content can include filtering media content from an active play queue of media content, adding media content to the active play queue of media content, re-ordering the sequence of content in the play-queue, supplementing the active play queue, and/or changing the frequency of playback of content in the play-queue. In accordance with an embodiment, the application can determine whether there is an active play queue of media content configured to play on the voice communications device, such as a playlist of music, a station of music, a mix of songs, etc. In the situation where there is no media content being played by the voice communications device or no active play queue of media content, the electronic media service application determines media content using information in the request. The information can be used to search a catalog of media content to identify media content in response to the spoken question or request. For example, the information can be used to identify media content associated with a mood, a tempo, a genre, an artist, a year, a decade, an activity as well as any other topic or interest. The identified media can thereafter be played using the voice communications device. In the situation where there is an active play queue of media content, the information can be used to refine the play queue. For example, the information can include instructions such as refinement instructions that can be used to filter the play queue and/or add media content to the play queue from a catalog of media content. In various embodiments, the user can further refine the playback of media content. For example, in the situation where the user is engaging in a multi-turn dialog interaction with the voice communications device, where the user sends multiple requests to the voice communications device to refine the media playing, the user can first instruct the device to play "happy" music. If the user desires "happier" music, the user can instruct the voice communications device to play "happier" music.

TTS module 1264 may employ various text-to-speech techniques. It should be noted that techniques for taking text and converting it into audio input data that can represent speech are well known in the art and need not be described in further detail herein, any suitable computer implemented techniques may be used. TTS module 1264 may also include processor(s) 1252, storage/memory 1254, and communications circuitry 1256.

Persons of ordinary skill in the art will recognize that although each of ASR module 1258, NLU module 1260, applications module 1262, and TTS module 1264 include instances of processor(s) 1252, storage/memory 1254, and communications circuitry 1256, those instances of processor(s) 1252, storage/memory 1254, and communications circuitry 1256 within each of ASR module 1258, NLU module 1260, applications module 1262, and STT/TTS module 1264 may differ. For example, the structure, function, and style of processor(s) 1252 within ASR module 1258 may be substantially similar to the structure, function, and style of processor(s) 1252 within NLU module 1260, however the actual processor(s) 1252 need not be the same entity.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   a device processor;
   a memory device including instructions that, when executed by the device processor, cause the computing system to:
   receive input data from a voice communications device, the input data corresponding to a command received by the voice communications device;
   determine at least a first user and a second user from the input data;
   determine a first account associated with the input data, the first account corresponding to the first user having permission to access content associated with the voice communications device;
   determine a second account associated with the input data, the second account corresponding to the second user having permission to access content associated with the voice communications device;
   extract a refinement from the command based at least on the first user and the second user, the refinement utilized to determine content accessible via the voice communications device;
   analyze a first catalog, associated with the first account, the first catalog being updated based at least in part on content accessed by the first account;
   analyze a second catalog, associated with the second account, the second catalog being updated based at least in part on content accessed by the first second account;
   use the refinement to identify selected content, the selected content including one or more features corresponding to the refinement and being selected from the first catalog of content and the second catalog of content;
   generate a combined set of recommendations from the selected content;
   play selected media from the combined set of recommendations using the voice communications device; and
   disregard the selected media for the purposes of updating either the first catalog or the second catalog.

2. The computing system of claim 1, wherein the instructions, when executed further enable the computing system to:
    determine the input data includes at least a plural pronoun;
    identify the second user based at least in part on a verbal input from the second user; and
    request second input data from the voice communications device, the second input data corresponding to an identity of the second user associated with the second account, when the second user has not provided the verbal input.

3. The computing system of claim 1, wherein the instructions, when executed further enable the computing system to:
    determine if the first account is an authorized account, the authorized account having permission to access content associated with the voice communications device;
    determine if the second account is a second authorized account, the second authorized account having permission to access content associated with the voice communications device; and
    provide access to catalogs of content from all accounts associated with the voice communications device when at least one of the first and second accounts are not authorized accounts.

4. The computing system of claim 3, wherein the instructions, when executed further enable the computing system to:
    update a history of the first and second accounts corresponding to media content playback when the first and second accounts are authorized accounts;
    update the history of the first or second accounts corresponding to the media content playback when one of the first or second accounts are authorized accounts; and
    generate a new history corresponding to media content playback when the first or second accounts are not authorized accounts.

5. A computing system, comprising:
    a computing device processor;
    a memory device including instructions that, when executed by the computing device processor, enable the computing system to:
    receive input data including a command to access content available to the computing device;
    identify a first user associated with the command;
    determine an authorized first account corresponding to the first user that includes permission to access the content and is associated with a first trained content model;
    retrieve a first user profile from the first trained content model, the first trained content model receiving user interactions with the computing device and predicting user preferences based at least in part on the user interactions;
    receive second input data corresponding to a second command to access content available to the computing device;
    analyze the second input data, to identify a second user associated with the second command, wherein presence of the second user is identified based on the first command and the second command;
    determine the second user does not have an authorized second account;
    retrieve a second trained content model, the second trained content model including commands and content corresponding to users without authorized accounts;
    determine content corresponding to the command based at least in part on the first user profile and the second content model;
    update the second trained content model, based at least in part on the content; and
    disregard the content for the purposes of updating the second trained content model.

6. The computing system of claim 5, wherein the instructions, when executed further enable the computing system to:
    identify a third user corresponding to a third authorized account and a third trained content model within a vicinity of the computing device; and
    retrieve a third user profile generated by the third trained content model, the third trained content model receiving third user interactions with the computing device and predicting third user preferences based at least in part on the third user interactions;
    wherein the determined content comprises first content suggest at least in part by the first user profile and third content suggested at least in part by the third user profile.

7. The computing system of claim 6, wherein the determined content from the first user profile and the third user profile has a similar attribute, the attributes including genre, artist, year, mood, or a combination thereof.

8. The computing system of claim 5, wherein the input data is a voice command and the first user is part of a plurality of users and the instructions, when executed further enable the computing system to:
    analyze the voice command to determine an identity of the first user; and
    access the authorized account based on the identity of the first user.

9. The computing system of claim 5, wherein the instructions, when executed further enable the computing system to:
    identify a third user corresponding to a third authorized account and a third trained content model within a vicinity of the computing device;
    determine the third authorized account includes a restriction, the restriction blocking access to content; and
    incorporate the restriction with the first trained content model, wherein content suggested based at least in part on the third trained content model does not include content corresponding to the restriction.

10. The computing system of claim 5, wherein the input data comprises a plural pronoun and wherein the instructions, when executed further enable the computing system to:
    request an identity of the second user corresponding to the plural pronoun;
    determine whether the second user has a valid customer account;
    return a notification when the second user does not have a valid customer account.

11. The computing system of claim 5, wherein the input data is provided from at least one of a voice command, an application on a user device, a visual indication, a near-field communication protocol, or a remote.

12. The computing system of claim 5, wherein the instructions, when executed further enable the computing system to:
    update the first trained content model based at least in part on the command and the determined content.

13. The computing system of claim 12, wherein the content accessible to the computing device includes music, movies, calendars, shopping applications, or a combination thereof.

14. The computing system of claim 5, wherein the determined content comprises content previously accessed by the first user based at least in part on the first user profile and content the first trained content model predicts the first user will enjoy based at least in part on the first user profile.

15. The computing system of claim 5, wherein the instructions, when executed further enable the computing system to:
identify the input data using automatic speech recognition (ASR) techniques, natural language understanding (NLU) techniques, or a combination thereof.

16. A method, comprising:
receiving input data including a command to access content available to the computing device;
identifying a first user associated with the command;
determining an authorized first account corresponding to the first user that includes permission to access the content and is associated with a first trained content model;
retrieving a first user profile from the first trained content model, the first trained content model receiving user interactions with the computing device and predicting user preferences based at least in part on the user interactions;
receiving second input data corresponding to a second command to access content available to the computing device;
analyzing the second input data, to identify a second user associated with the second command, wherein presence of the second user is identified based on the first command and the second command;
determining the second user does not have an authorized second account;
retrieving a second trained content model, the second trained content model including commands and content corresponding to users without authorized accounts;
determining content corresponding to the command based at least in part on the first user profile and the second content model;
updating the second trained content model, based at least in part on the content; and
disregarding the content for the purposes of updating the second trained content model.

17. The method of claim 16, further including:
identifying a third user corresponding to a third authorized account and a third trained content model within a vicinity of the computing device;
determining the third authorized account includes a restriction, the restriction blocking access to content; and
incorporating the restriction with the first trained content model, wherein content suggested based at least in part on the third trained content model does not include content corresponding to the restriction.

18. The method of claim 16, wherein the input data is a voice command from a first user of the plurality of users, the method further comprising:
identifying a third user corresponding to a third authorized account and a third trained content model within a vicinity of the computing device; and
retrieving a third user profile generated by the third trained content model, the third trained content model receiving third user interactions with the computing device and predicting third user preferences based at least in part on the third user interactions;
wherein the determined content comprises first content suggested at least in part by the first user profile and third content suggested based at least in part by the third user profile.

19. The method of claim 16, further comprising:
receiving third input data corresponding to a third command to access content available to the computing device;
analyzing the third input data to identify a third user associated with the third command;
determining the second user does not have an authorized second account;
retrieve an unrecognized user trained content model, the unrecognized user trained content model including commands and content corresponding to users without authorized accounts; and
determining content based at least in part on the unrecognized user trained content model.

* * * * *